United States Patent
Fukushima et al.

(10) Patent No.: US 10,879,811 B2
(45) Date of Patent: Dec. 29, 2020

(54) SWITCHING POWER SUPPLY DEVICE AND SEMICONDUCTOR DEVICE

(71) Applicant: Rohm Co., Ltd., Kyoto (JP)

(72) Inventors: Shun Fukushima, Kyoto (JP); Yosuke Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/447,157

(22) Filed: Jun. 20, 2019

(65) Prior Publication Data

US 2019/0393796 A1 Dec. 26, 2019

(30) Foreign Application Priority Data

Jun. 22, 2018 (JP) .................................. 2018-118504

(51) Int. Cl.
*H02M 3/335* (2006.01)
*H02H 7/12* (2006.01)
*H02M 1/00* (2006.01)
*H02M 3/156* (2006.01)
*H02M 3/158* (2006.01)

(52) U.S. Cl.
CPC ...... *H02M 3/33592* (2013.01); *H02H 7/1213* (2013.01); *H02M 3/156* (2013.01); *H02M 3/158* (2013.01); *H02M 2001/0054* (2013.01)

(58) Field of Classification Search
CPC ....... H02M 3/156–158; H02M 3/1588; H02M 3/33507; H02M 3/33523; H02M 3/33563; H02M 3/33592; H02M 2001/0009; H02M 2001/0054; H02M 1/08; H02M 1/088; Y02B 70/1466; Y02B 70/126

USPC ................................. 323/238, 271, 282–286
See application file for complete search history.

(56) References Cited

U.S. PATENT DOCUMENTS

| | | | | |
|---|---|---|---|---|
| 8,686,705 | B2* | 4/2014 | Yamakoshi | H02M 1/36 323/282 |
| 9,584,019 | B2* | 2/2017 | Shiwaya | H02M 3/158 |
| 2012/0126772 | A1 | 5/2012 | Yamakoshi et al. | |
| 2013/0207625 | A1* | 8/2013 | Futamura | G05F 1/10 323/271 |
| 2015/0280567 | A1* | 10/2015 | Fukumoto | H02M 3/156 323/271 |
| 2015/0326123 | A1* | 11/2015 | Fukushima | H02M 3/158 323/271 |
| 2018/0226877 | A1* | 8/2018 | Fukumoto | H02M 3/1588 |
| 2019/0181750 | A1* | 6/2019 | Fukumoto | H02M 3/155 |

FOREIGN PATENT DOCUMENTS

JP 2012-114987 6/2012

* cited by examiner

*Primary Examiner* — Yemane Mehari
(74) *Attorney, Agent, or Firm* — Fish & Richardson P.C.

(57) ABSTRACT

A switching power supply device has a switching output stage generating an output voltage from an input voltage by switching operation and a controller controlling the switching output stage based on a feedback voltage commensurate with the output voltage. The switching power supply device can perform switching suspension control whereby it stops switching operation on detecting a light-load condition based on the feedback voltage, though it restarts switching operation on detection of an overvoltage condition during suspension of switching operation.

16 Claims, 10 Drawing Sheets

FIG.6

| SLP | OVP_DET | CONTROL | SWITCHING OPERATION | CLAMP CIRCUIT | Vcmp |
|---|---|---|---|---|---|
| Lo | Lo | 1ST CONTROL | PERFORMED | REGULAR CLAMP STATE | CONTROLLED BY ERROR AMPLIFIER |
| Hi | Lo | 2ND CONTROL | SUSPENDED (SLEEP) | — | CONTROLLED BY ERROR AMPLIFIER |
| Hi | Hi | 3RD CONTROL | PERFORMED | EXPANDED CLAMP STATE | FORCIBLY AT Vmin2 |
| Lo | Hi | 4TH CONTROL | PERFORMED | EXPANDED CLAMP STATE | FORCIBLY AT Vmin2 |

※ N.B. After OVP_DET turns from high to low, irrespective of SLP level, switching operation is performed & expanded clamp state is held for predetermined time $t_{HLD}$.

FIG.7

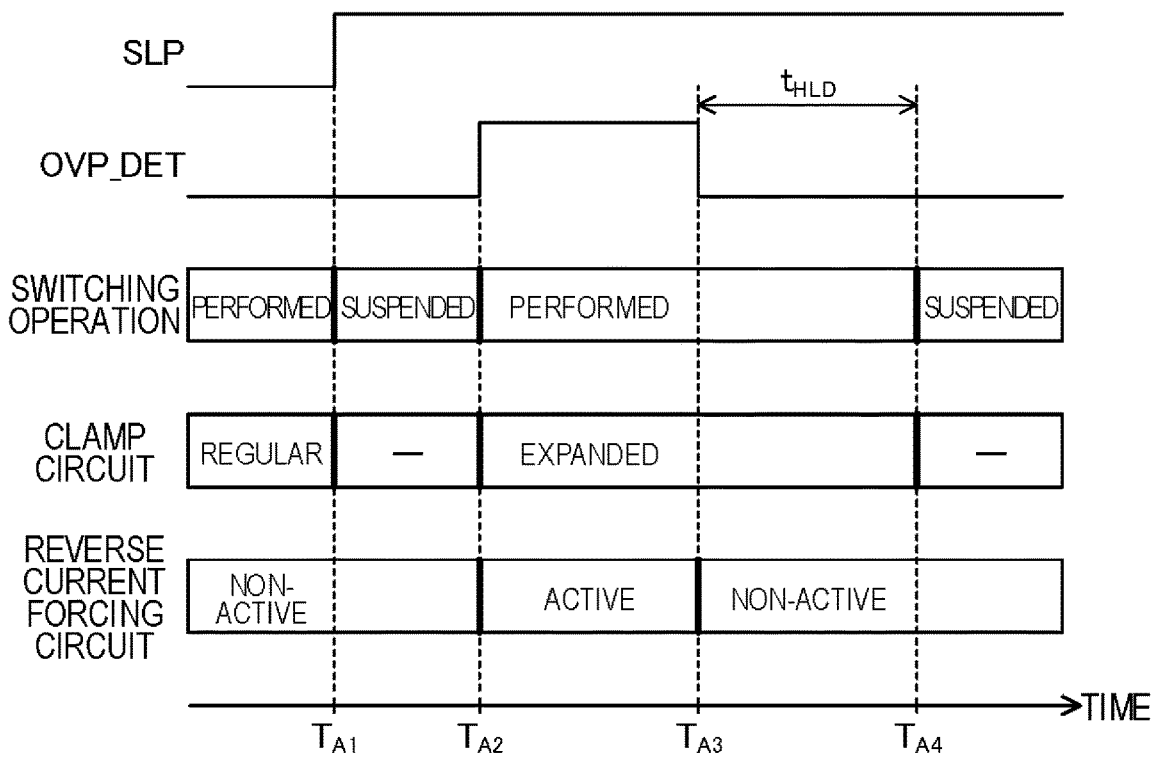

SWITCHING POWER SUPPLY DEVICE AND SEMICONDUCTOR DEVICE

This nonprovisional application claims priority under 35 U.S.C. § 119(a) on Patent Application No. 2018-118504 filed in Japan on Jun. 22, 2018, the entire contents of which are hereby incorporated by reference.

BACKGROUND OF THE INVENTION

1. Field of the Invention

The present invention relates to a switching power supply device and a semiconductor device.

2. Description of Related Art

There are generally known switching power supply devices that include an output transistor provided between a terminal to which an input voltage is applied and a terminal to which an output voltage is applied and that make the output transistor perform switching based on a feedback voltage commensurate with the output voltage and a predetermined reference voltage. For switching control, current-mode control is often adopted (see Patent Document 1 identified below).

In switching power supply devices, protection of the output voltage from an overvoltage is essential, and hence many switching power supply devices are provided with some overvoltage protection function.

RELATED-ART DOCUMENT

Patent Document 1 (Japanese Patent Application published as No. 2012-114987).

Inconveniently, depending on the type of faults that can occur in switching power supply devices, it can be difficult to protect the output voltage from an overvoltage (details will be given later), and thus there is room for improvement in the overvoltage protection function.

SUMMARY OF THE INVENTION

An object of the present invention is to provide a switching power supply device and a semiconductor device that contribute to the attainment of satisfactory overvoltage protection.

A first switching power supply device according to the present invention is a switching power supply device including: a switching output stage configured to generate an output voltage from an input voltage by switching operation; a controller configured to control the switching output stage based on a feedback voltage commensurate with the output voltage; a sleep determiner configured to be capable of outputting a suspension control signal based on the feedback voltage or based on the voltage of a signal generated based on the feedback voltage; and an overvoltage detector configured to check whether or not the output voltage is in an overvoltage condition based at least on the feedback voltage and to output an overvoltage detection signal when the output voltage is in the overvoltage condition. The controller is configured to be capable of performing switching suspension control in which the controller suspends the switching operation on receiving the suspension control signal and to restart the switching operation on receiving the overvoltage detection signal while performing the switching suspension control.

Specifically, for example, in the first switching power supply device described above, a coil can be provided between the switching output stage and a terminal to which the output voltage is applied, and the controller can be configured to, on receiving the overvoltage detection signal while performing the switching suspension control, restart the switching operation in a manner that allows a reverse current to flow from the coil to the switching output stage.

More specifically, for example, in the first switching power supply device described above, the switching output stage can include an output transistor and a synchronous rectification transistor that are connected in series with each other and that are turned on and off alternately through the switching operation based on the feedback voltage, and the controller includes: an error amplifier configured to output to an error signal line an error signal commensurate with the difference between the feedback voltage and a predetermined reference voltage; and a coil current detector configured to sense the current through the coil, which is connected in series between the connection node between the output transistor and the synchronous rectification transistor and the terminal to which the output voltage is applied, to output a current sense signal commensurate with the sensed current. The controller can be configured to achieve the switching operation by generating a drive signal for the switching output stage based on a signal on the error signal line and the current sense signal.

Still more specifically, for example, in the first switching power supply device described above, there can be further provided a clamp circuit configured to limit the variable range of the signal on the error signal line thereby to limit the variable range of the current through the coil during the switching operation. The lower-limit value of the variable range of the current through the coil can be set at one of a first lower-limit value and a second lower-limit value so that, when the current value in the coil is equal to or larger than the first lower-limit value, a current flows from the connection node toward the coil while, when the current value in the coil equals the second lower-limit value, the reverse current flows from the coil toward the connection node. The controller can be configured to control the clamp circuit such that, before receiving the overvoltage detection signal, the lower-limit value equals the first lower-limit value and that, on and after receiving the overvoltage detection signal, the lower-limit value equals the second lower-limit value.

Here, for example, in the first switching power supply device described above, there can be further provided a forcing circuit configured to forcibly set the signal voltage on the error signal line at a voltage corresponding to the second lower-limit value irrespective of the output of the error amplifier when the overvoltage detection signal is being output.

Then, for example, in the first switching power supply device described above, the controller can be configured to, after restarting the switching operation in response to receipt of the overvoltage detection signal during the switching suspension control, on detecting elimination of the overvoltage condition, perform the switching operation continuously for a predetermined time irrespective of the output of the sleep determiner and, after a lapse of the predetermined time, to control the clamp circuit such that the lower-limit value returns from the second lower-limit value to the first lower-limit value.

For another example, in the first switching power supply device described above, the sleep determiner can be configured to output the suspension control signal based on the result of comparison of the feedback voltage with a predetermined sleep determination voltage.

For another example, in the first switching power supply device described above, there can be further provided a forcing circuit configured to forcibly set the signal voltage on the error signal line at a predetermined voltage irrespective of the output of the error amplifier when the overvoltage detection signal is being output. The predetermined voltage can be determined such that, during the switching operation with the signal voltage on the error signal line at the predetermined voltage, the reverse current flows from the coil toward the connection node.

For another example, in the first switching power supply device described above, the sleep determiner can output the suspension control signal based on the result of comparison of the signal voltage on the error signal line with a predetermined sleep determination voltage.

A second switching power supply device according to the present invention is a switching power supply device including: a switching output stage configured to generate an output voltage from an input voltage by switching operation; a first input terminal at which to receive a feedback voltage resulting from voltage division of the output voltage; a second input terminal at which to receive the output voltage; a controller configured to control the switching output stage based on the voltage at the first input terminal; and an overvoltage detector configured to check whether or not the output voltage is in an overvoltage condition based at least on the voltage at the second input terminal and to output an overvoltage detection signal when the output voltage is in the overvoltage condition. A coil can be provided between the switching output stage and a terminal to which the output voltage is applied, and the controller can configured to perform the switching operation in a manner that restricts a reverse current flowing from the coil to the switching output stage before receiving the overvoltage detection signal and to perform the switching operation in a manner that generates the reverse current on and after receiving the overvoltage detection signal.

Specifically, for example, in the second switching power supply device described above, the switching output stage can include an output transistor and a synchronous rectification transistor that are connected in series with each other and that are turned on and off alternately through the switching operation based on the voltage at the first input terminal. The controller can includes: an error amplifier configured to output to an error signal line an error signal commensurate with the difference between the voltage at the first input terminal and a predetermined reference voltage; and a coil current detector configured to sense the current through the coil, which is connected in series between the connection node between the output transistor and the synchronous rectification transistor and the terminal to which the output voltage is applied, to output a current sense signal commensurate with the sensed current. The controller can be configured to achieve the switching operation by generating a drive signal for the switching output stage based on a signal on the error signal line and the current sense signal.

More specifically, for example, in the second switching power supply device described above, there can be further provided a clamp circuit configured to limit the variable range of the signal on the error signal line thereby to limit the variable range of the current through the coil during the switching operation. The lower-limit value of the variable range of the current through the coil can be set at one of a first lower-limit value and a second lower-limit value so that, when the current value in the coil is equal to or larger than the first lower-limit value, a current flows from the connection node toward the coil while, when the current value in the coil equals the second lower-limit value, the reverse current flows from the coil toward the connection node. The switching power supply device can further include a forcing circuit configured to forcibly set the signal voltage on the error signal line at a voltage corresponding to the second lower-limit value irrespective of the output of the error amplifier when the overvoltage detection signal is being output.

Here, for example, in the second switching power supply device described above, the controller can be configured to control the clamp circuit such that, before receiving the overvoltage detection signal, the lower-limit value equals the first lower-limit value and that, on and after receiving the overvoltage detection signal, the lower-limit value equals the second lower-limit value.

Or, for example, in the second switching power supply device described above, there can be further provided a forcing circuit configured to forcibly set the signal voltage on the error signal line at a predetermined voltage irrespective of the output of the error amplifier when the overvoltage detection signal is being output. The predetermined voltage can be determined such that, during the switching operation with the signal voltage on the error signal line at the predetermined voltage, the reverse current flows from the coil toward the connection node.

A semiconductor device according to the present invention is a semiconductor device that constitutes the first or second switching power supply device described above and that is formed by use of an integrated circuit.

According to the present invention, it is possible to provide a switching power supply device and a semiconductor device that contribute to the attainment of satisfactory overvoltage protection.

BRIEF DESCRIPTION OF THE DRAWINGS

FIG. 6 is a diagram showing a relationship of control signals generated within a switching power supply IC with whether or not switching operation is performed and the like in the first embodiment of the present invention;

FIG. 7 is a diagram showing signal waveforms, whether or not switching operation is performed, and the like on occurrence of a particular fault in Practical Example EX1_2 belonging to the first embodiment of the present invention;

DETAILED DESCRIPTION OF PREFERRED EMBODIMENTS

Hereinafter, examples embodying the present invention will be described specifically with reference to the accompanying drawings. Among the diagrams referred to, the same parts are identified by the same reference signs, and in principle no overlapping description of the same parts will be repeated. In the present description, for the sake of simple description, symbols and other designations referring to information, signals, physical quantities, components, and the like are occasionally used with the names of the corresponding information, signals, physical quantities, components, and the like omitted or abbreviated. For example, a switching power supply IC, which will be described later and identified by the reference sign "100", is sometimes mentioned as "switching power supply IC 100" and is other times abbreviated to "power IC 100" or "IC 100", all these referring to the same component.

First, some terms used in the following description will be defined.

A "ground" denotes a conductor at a reference potential of 0 V (zero volts), and also refers to such a reference potential itself. In any embodiment, a voltage mentioned with no reference stated is a voltage relative to the ground.

A "line" is synonymous with a wiring conductor.

In any embodiment, a "level" denotes a potential level; with respect to a given signal or voltage, a "high level" is a potential level higher than that of a "low level".

With respect to a given transistor configured as an FET, an "on-state" denotes a state where the channel between the drain and the source of the transistor is in a conducting state; an "off-state" denotes a state where the channel between the drain and the source of the transistor is in a non-conducting (cut-off) state. A transistor in an on- or off-state is sometimes referred to as being, simply, on or off.

First Embodiment

Figure 1:
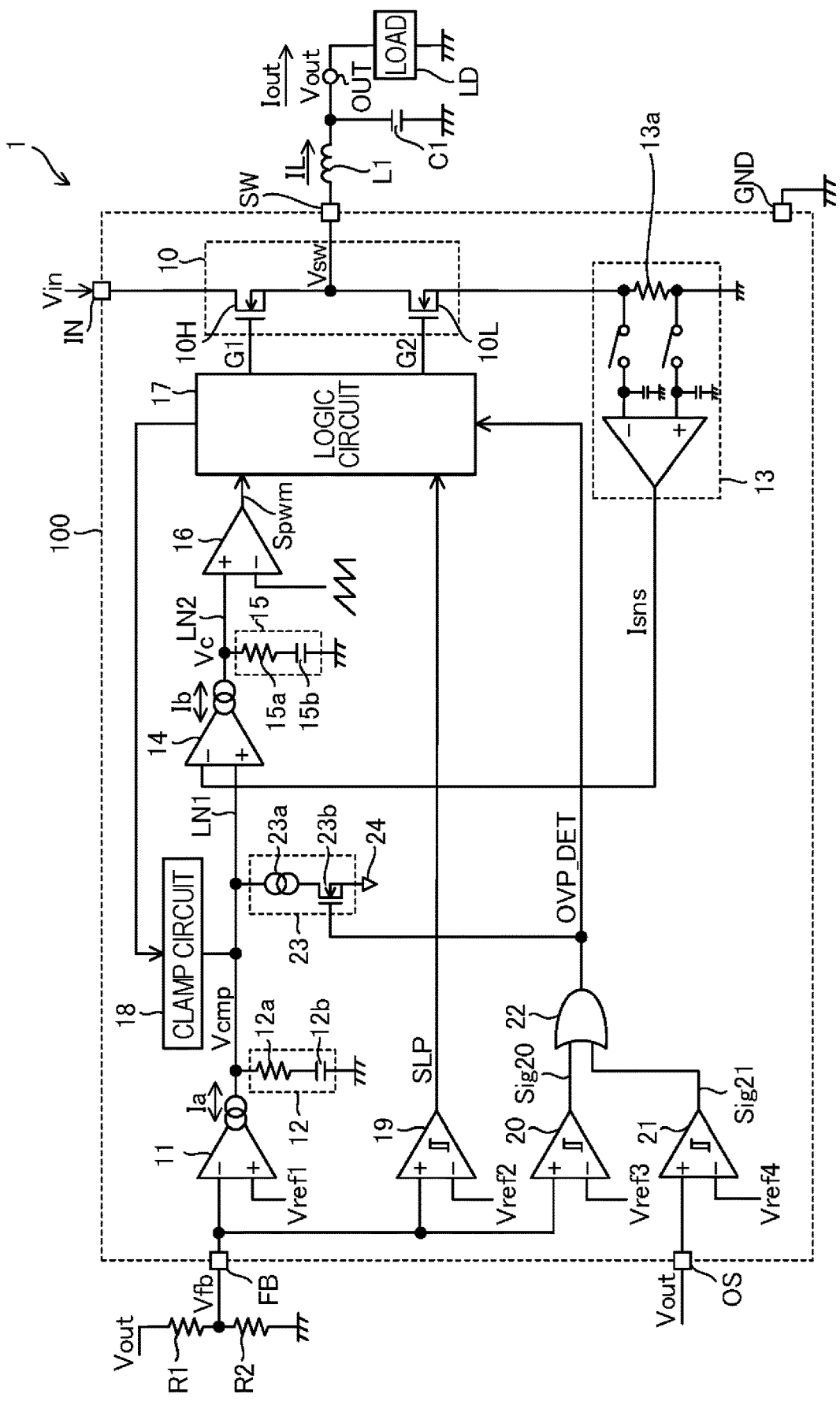
FIG. 1 is an overall configuration diagram of a switching power supply device according to a first embodiment of the present invention.

A first embodiment of the present invention will be described. FIG. 1 is an overall configuration diagram of a switching power supply device 1 according to the first embodiment of the present invention. The switching power supply device 1 of FIG. 1 includes a switching power supply IC 100 and a plurality of discrete components that are externally connected to the switching power supply IC 100, and these discrete components include a capacitor C1, a coil L1, and resistors R1 and R2. The switching power supply device 1 is configured as a step-down switching power supply device that generates from a desired input voltage Vin a desired output voltage Vout. The output voltage Vout is supplied to a load LD, which is connected to an output terminal OUT. The input voltage Vin and the output voltage Vout are positive direct-current voltages, and the output voltage Vout is lower than the input voltage Vin. The output voltage Vout appears at the output terminal OUT of the switching power supply device 1. The input voltage Vin equals, for example, 12 V. Adjusting the resistance values of the resistors R1 and R2 permits the output voltage Vout to be stabilized at a desired positive voltage (for example, 3.3 V or 5 V) less than 12 V. The current that flows into the load LD via the output terminal OUT is referred to as the output current Iout.

Figure 2:
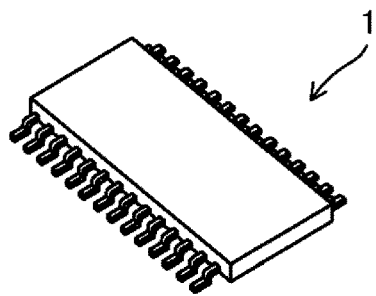
FIG. 2 is an exterior view of a switching power supply IC in the first embodiment of the present invention.

The switching power supply IC 100 is, as shown in FIG. 2, an electronic component that is produced by sealing a semiconductor integrated circuit in a casing (package) made of resin. The casing of the switching power supply IC 100 is provided with a plurality of external terminals that are exposed, and these external terminals include, as shown in FIG. 1, an input terminal IN, a switching terminal SW, a feedback terminal FB, an output monitor terminal OS, and a ground terminal GND. The external terminals may further include any other terminals. It should be noted that the number of external terminals in, and the appearance of, the switching power supply IC 100 shown in FIG. 2 are merely an example.

First, the external configuration of the switching power supply IC 100 will be described. From outside the switching power supply IC 100, the input voltage Vin is supplied to the input terminal IN. Between the switching terminal SW and the output terminal OUT, the coil L1 is connected in series. That is, one terminal of the coil L1 is connected to the switching terminal SW, and the other terminal of the coil L1 is connected to the output terminal OUT. The output terminal OUT is connected via the capacitor C1 to a ground. The output terminal OUT is connected also to one terminal of the resistor R1, and the other terminal of the resistor R1 is connected via the resistor R2 to the ground. The connection node between the resistors R1 and R2 is connected to the feedback terminal FB. To the output monitor terminal OS, the output voltage Vout is applied, and the ground terminal GND is connected to the ground.

Next, the internal configuration of the switching power supply IC 100 will be described. The switching power supply IC 100 includes components identified by the reference signs 10 to 24.

A switching output stage 10 includes transistors 10H and 10L that are configured as N-channel MOSFETs (metal-oxide-semiconductor field-effect transistors). The transistors 10H and 10L are a pair of switching elements connected in series between the input terminal IN and the ground terminal GND (in other words, the ground). As these transistors are driven to switch, the input voltage Vin is subjected to switching so that a switching voltage Vsw with a rectangular (square) waveform appears at the switching terminal SW. The transistor 10H is provided on the high side, and the transistor 10L is provided on the low side. Specifically, the drain of the transistor 10H is connected to the input terminal IN, and the source of the transistor 10H and the drain of the transistor 10L are both connected to the switching terminal SW. The source of the transistor 10L may be connected directly to the ground; here, however, it is assumed that the source of the transistor 10L is connected via a sense resistor 13a to the ground.

The transistor 10H functions as an output transistor, and the transistor 10L functions as a synchronous rectification transistor. The inductor L1 and the capacitor C1 constitute a rectifying-smoothing circuit that produces the output voltage Vout by rectifying and smoothing the switching voltage Vsw with a rectangular waveform that appears at the switching terminal SW. The resistors R1 and R2 constitute a voltage division circuit that divides the output voltage Vout. The connection node between the resistors R1 and R2 is connected to the feedback terminal FB, so that the divided voltage that appears at the connection node is fed, as a feedback voltage Vfb, to the feedback terminal FB.

The gates of the transistors 10H and 10L are fed with, as drive signals, gate signals G1 and G2 respectively, so that the transistors 10H and 10L are turned on and off according to the gate signals G1 and G2. Basically, the transistors 10H and 10L are turned on and off alternately, though they may both be kept off at some moments (details will be given later).

An error amplifier 11 is a transconductance amplifier of a current output type. The inverting input terminal of the error amplifier 11 is fed with the voltage applied to the feedback terminal FB (that is, the feedback voltage Vfb). The non-inverting input terminal of the error amplifier 11 is fed with a predetermined reference voltage Vref1. The reference voltage Vref1 and the other reference voltages Vref2 to Vref4 that will be mentioned later are direct-current voltages with mutually different positive voltage values, and are generated by a reference voltage generation circuit (not illustrated) within the switching power supply device 1. The error amplifier 11 outputs, from its output terminal, an error current signal Ia that is commensurate with the difference between the feedback voltage Vfb and the reference voltage Vref1. Electric charge ascribable to the error current signal Ia is input to and output from an error signal line LN1. Specifically, the error amplifier 11 so operates that, when the feedback voltage Vfb is lower than the reference voltage Vref1, a current ascribable to the error current signal Ia is delivered from the error amplifier 11 toward the error signal line LN1 so that the potential on the error signal line LN1 increases and that, when the feedback voltage Vfb is higher than the reference voltage Vref1, a current ascribable to the error current signal Ia is retrieved from the error signal line LN1 toward the error amplifier 11 so that the potential on the error signal line LN1 decreases. As the absolute value of the above-mentioned difference increases, the magnitude of the current ascribable to the error current signal Ia increases.

A phase compensator 12 is provided between the error signal line LN1 and the ground. The phase compensator 12 is fed with the error current signal Ia, and generates an error voltage signal Vcmp. The error voltage signal Vcmp indicates the potential on the error signal line LN1. The phase compensator 12 includes a serial circuit composed of a resistor 12a and a capacitor 12b. Specifically, one terminal of the resistor 12a is connected to the error signal line LN1, and the other terminal of the resistor 12a is connected via the capacitor 12b to the ground. Adequately setting the resistance value of the resistor 12a and the capacitance value of the capacitor 12b makes it possible to correct the phase of the error voltage signal Vcmp and thereby prevent oscillation of the output feedback loop. A clamp circuit 18 and a reverse current forcing circuit 23, which are connected to the error signal line LN1 and which affect the error voltage signal Vcmp, will be described later.

A current detector 13 samples the coil current IL that flows through the coil L1 with predetermined timing, and outputs a current sense signal Isns that indicate the value of the so sampled coil current IL. Here, it is assumed that the current sense signal Isns is a voltage signal such that, when the coil current IL has a positive polarity, the current sense signal Isns has a positive voltage value and that, when the coil current IL has a negative polarity, the current sense signal Isns has a negative voltage value. It is assumed that a coil current IL that flows from the switching terminal SW to the output terminal OUT has a positive polarity, and that a coil current IL that flows from the output terminal OUT to the switching terminal SW has a negative polarity. The absolute value of the voltage of the current sense signal Isns is proportional to the absolute value of the coil current IL, and increases as the absolute value of the coil current IL increases. In the switching power supply device 1 of FIG. 1, the current detector 13 includes a sense resistor 13a that is provided between the source of the transistor 10L and the ground. The current detector 13 generates the current sense signal Isns by sampling the voltage drop across the sense resistor 13a during the period in which the transistor 10L is on.

The non-inverting input terminal of a differential amplifier 14 is fed with the error voltage signal Vcmp, which is applied to the error signal line LN1. The inverting input terminal of the differential amplifier 14 is fed with the current sense signal Isns. The differential amplifier 14 outputs, from its output terminal, a current signal Ib that is commensurate with the difference between the error voltage signal Vcmp and the current sense signal Isns. The differential amplifier 14 too is configured as a transconductance amplifier of a current output type. Electric charge ascribable to the current signal Ib is input to and output from a line LN2. Specifically, the differential amplifier 14 so operates that, when the voltage of the error voltage signal Vcmp is higher than the voltage of the current sense signal Isns, a current ascribable to the current signal Ib is delivered from the differential amplifier 14 toward the line LN2 so that the potential on the line LN2 increases and that, when the voltage of the error voltage signal Vcmp is lower than the voltage of the current sense signal Isns, a current ascribable to the current signal Ib is retrieved from the LN2 toward the differential amplifier 14 so that the potential on the line LN2 decreases. As the absolute value of the difference between the error voltage signal Vcmp and the current sense signal Isns increases, the magnitude of the current ascribable to the current signal Ib increases.

A phase compensator 15 is provided between the line LN2 and the ground. The phase compensator 15 is fed with the current signal Ib, and generates a voltage signal Vc. The voltage signal Vc indicates the potential on the line LN2. The phase compensator 15 includes a serial circuit composed of a resistor 15a and a capacitor 15b. Specifically, one terminal of the resistor 15a is connected to the line LN2, and the other terminal of the resistor 15a is connected via the capacitor 15b to the ground. Adequately setting the resistance value of the resistor 15a and the capacitance value of the capacitor 15b makes it possible to correct the phase of the voltage signal Vc and thereby prevent oscillation of the output feedback loop.

The non-inverting input terminal of a PWM comparator 16 is fed with the voltage signal Vc. The inverting input terminal of the PWM comparator 16 is fed with a ramp signal of which the signal value varies periodically with a predetermined switching period. The ramp signal is a periodic signal generated by a ramp signal generation circuit (not illustrated) provided in the switching power supply IC 100, and has, for example, a triangular or saw-tooth waveform. The PWM comparator 16 compares the voltage signal Vc with the ramp signal, and outputs a pulse width modulation signal Spwm that indicates the result of the comparison. The pulse width modulation signal Spwm is at high level during the period in which the voltage signal Vc is higher than the ramp signal, and is at low level during the period in which the voltage signal Vc is lower than the ramp signal. The higher the voltage signal Vc, the higher the on-duty of the switching output stage 10 (that is, the proportion of the period in which the transistor 10H is on within the above-mentioned switching period).

Based on the pulse width modulation signal Spwm, a logic circuit 17 can perform switching operation on the transistors 10H and 10L. The transistors 10H and 10L themselves can be considered to be the agent of switching operation (that is, the transistors 10H and 10L can be considered to perform switching operation based on signals from the logic circuit 17). In switching operation, based on the pulse width modulation signal Spwm, the transistors 10H and 10L are turned on and off alternately. The error amplifier 11 generates the error current signal Ia such that the feedback voltage Vfb remains equal to the reference voltage Vref1, and thus, as long as switching operation is performed, the output voltage Vout is stabilized at a predetermined target voltage Vtg that is commensurate with the reference voltage Vref1 and the ratio of voltage division by the resistors R1 and R2.

More specifically, in switching operation, during the period in which the pulse width modulation signal Spwm is at high level, a high-level gate signal G1 and a low-level gate signal G2 are fed to the gates of the transistors 10H and 10L respectively; during the period in which the pulse width modulation signal Spwm is at low level, a low-level gate signal G1 and a high-level gate signal G2 are fed to the gates of the transistors 10H and 10L respectively. The transistor 10H is, when fed with a high-level gate signal G1, in the on-state and, when fed with a low-level gate signal G1, in the off-state. Likewise, the transistor 10L is, when fed with a high-level gate signal G2, in the on-state and, when fed with a low-level gate signal G2, in the off-state. To reliably prevent a through-current, a dead time, that is, a period in which the transistors 10H and 10L are both off, may be inserted between the period in which the transistor 10H is on and the period in which the transistor 10L is on.

The input voltage Vin may have any value, and so may the target voltage Vtg of the output voltage Vout (provided that Vin>Vtg). For example, the input voltage Vin is 12 V or 24 V, and the target voltage Vtg is 3.3 V or 5 V.

As described above, the switching power supply device 1 employs current-mode control, in which output feedback control is performed based on both the output voltage Vout and the coil current IL. The current sense signal Isns, which is commensurate with the coil current IL, is fed back to the differential amplifier 14, and the differential amplifier 14 so operates that, as the error voltage signal Vcmp rises, the coil current IL increases and that, as the error voltage signal Vcmp falls, the coil current IL decreases. In this way, it is possible to control the magnitude of the coil current IL according to the error voltage signal Vcmp; it is thus possible to limit the error voltage signal Vcmp and thereby indirectly limit the coil current IL.

Figure 3A:
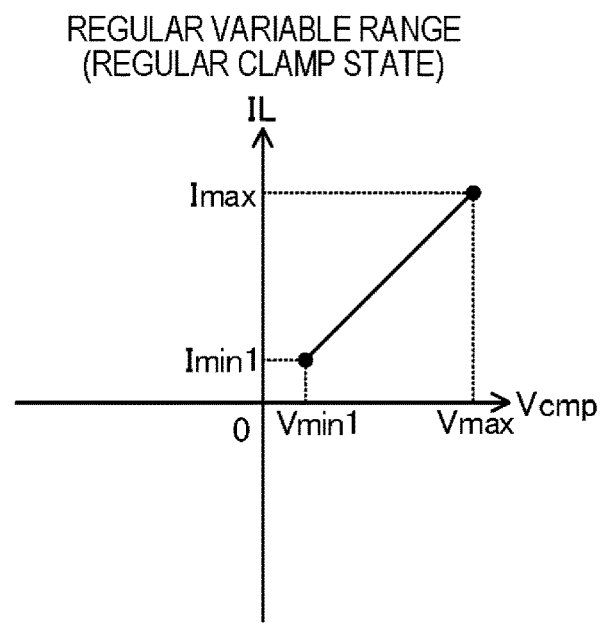
FIGS. 3A and 3B are diagrams showing voltage and current variation ranges with a clamp circuit in a regular clamp state and in an expanded clamp state, respectively, in the first embodiment of the present invention.
Figure 3B:
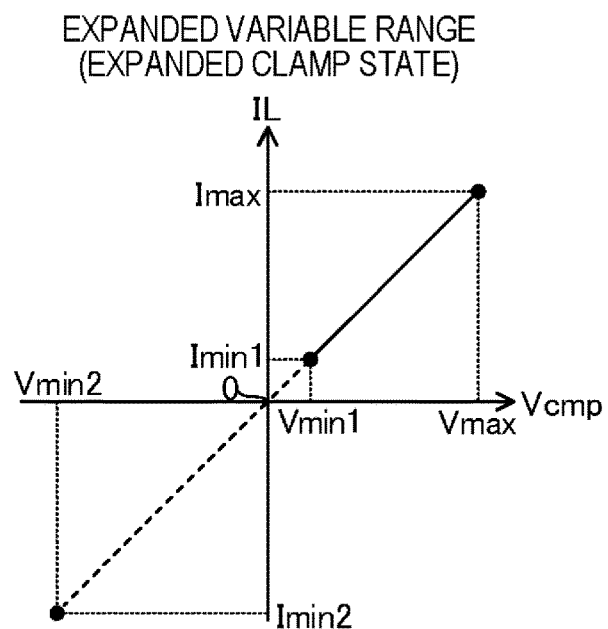

The clamp circuit 18 is a circuit that sets an upper and a lower limit on the error voltage signal Vcmp and thereby sets an upper and a lower limit on the coil current IL. That is, the clamp circuit 18 sets limits on the variable range of the error voltage signal Vcmp and thereby limits the variable range of the coil current IL (specifically, it limits the variable range of the coil current IL during switching operation). As shown in FIGS. 3A and 3B, under the control of the logic circuit 17, the clamp circuit 18 takes one of two states: a regular clamp state in which a predetermined regular variable range is used as the variable range of the error voltage signal Vcmp and an expanded clamp state in which a predetermined expanded variable range is used as the variable range of the error voltage signal Vcmp.

As shown in FIG. 3A, the regular variable range is a voltage range equal to or higher than a predetermined lower-limit voltage value Vmin1 but equal to or lower than a predetermined upper-limit voltage value Vmax. Accordingly, in the regular clamp state, the clamp circuit 18 limits the error voltage signal Vcmp such that the voltage value of the error voltage signal Vcmp on the error signal line LN1 neither falls below the lower-limit voltage value Vmin1 nor rises above the upper-limit voltage value Vmax. When the voltage value of the error voltage signal Vcmp equals the lower-limit voltage value Vmin1, the output feedback loop including the differential amplifier 14 generates the current signal Ib such that the voltage value of the current sense signal Isns equals the lower-limit voltage value Vmin1. Likewise, when the voltage value of the error voltage signal Vcmp equals the upper-limit voltage value Vmax, the output feedback loop including the differential amplifier 14 generates the current signal Ib such that the voltage value of the current sense signal Isns equals the upper-limit voltage value Vmax. Thus, if the value of the coil current IL as observed when the voltage value of the current sense signal Isns equals the lower-limit voltage value Vmin1 or the upper-limit voltage value Vmax is represented by Imin1 or Imax respectively, then, in the regular clamp state, the variable range of the coil current IL is limited to equal to or higher than the lower-limit current value Imin1 but equal to or lower than the upper-limit current value Imax.

As shown in FIG. 3B, the expanded variable range is a voltage range equal to or higher than a predetermined lower-limit voltage value Vmin2 but equal to or lower than the predetermined upper-limit voltage value Vmax. Accordingly, in the expanded clamp state, the clamp circuit 18 limits the error voltage signal Vcmp such that the voltage value of the error voltage signal Vcmp on the error signal line LN1 neither falls below the lower-limit voltage value Vmin2 nor rises above the upper-limit voltage value Vmax. When the voltage value of the error voltage signal Vcmp equals the lower-limit voltage value Vmin2, the output feedback loop including the differential amplifier 14 generates the current signal Ib such that the voltage value of the current sense signal Isns equals the lower-limit voltage value Vmin2. Likewise, when the voltage value of the error voltage signal Vcmp equals the upper-limit voltage value Vmax, the output feedback loop including the differential amplifier 14 generates the current signal Ib such that the voltage value of the current sense signal Isns equals the upper-limit voltage value Vmax. Thus, if the value of the coil current IL as observed when the voltage value of the current sense signal Isns equals the lower-limit voltage value Vmin2 or the upper-limit voltage value Vmax is represented by Imin2 or Imax respectively, then, in the expanded clamp state, the variable range of the coil current IL is limited to equal to or higher than the lower-limit current value Imin2 but equal to or lower than the upper-limit current value Imax.

With respect to the variable ranges of both the error voltage signal Vcmp and the coil current IL, the upper-limit values (upper-limit voltage value and upper-limit current value) and the lower-limit values (lower-limit voltage value and lower-limit current value) are all polarity-sensitive (sign-sensitive) values: a given positive value is larger than any given negative value, and for a negative value, the larger its absolute value is, the smaller value it is considered to have. Those limit values satisfy simultaneously the relationships "Vmin2<0<Vmin1<Vmax" and "Imin2<0<Imin1<Imax". Accordingly, for example, when "Vcmp≥Vmin1", and hence "IL≥Imin1", then a positive coil current IL flows;

when "0>Vcmp≥Vmin2", and hence "0>IL≥Imin2", then a negative coil current IL flows. The current values Imin2, Imin1, and Imax are, for example, −3 A (amperes), 0.4 A, and 3 A respectively.

Setting an upper limit on the error voltage signal Vcmp and thereby setting an upper limit on the coil current IL serves as overcurrent protection for saving the switching output stage 10 and the coil L1 from an overcurrent. On the other hand, the switching power supply device 1 is intended to pass a positive current through the coil L1 and thereby stabilize the output voltage Vout at a positive target voltage Vtg while supplying electric power to the load LD connected to the output terminal OUT; thus, intrinsically, it should be avoided to pass a negative current (that is, a current flowing from the output terminal OUT toward the switching terminal SW, sometimes referred to as a reverse current in the following description) through the coil L1. In the regular clamp state, setting the lower limit of the coil current IL at the positive value "Imin1" prevents a reverse current (achieves reverse current protection). It can generally be said that what has to be done is simply keeping reverse current protection in effect all the time. Nevertheless, in the switching power supply device 1, the expanded clamp state is intentionally evoked under a certain condition to generate a reverse current. The significance of doing so will become clear as the description proceeds.

A light-load detection comparator 19 is a comparator for detecting a light-load condition. The light-load detection comparator 19 compares the feedback voltage Vfb, which is fed to the non-inverting input terminal of the comparator 19, with a reference voltage Vref2, which is fed to the inverting input terminal of the comparator 19, and outputs a control signal SLP that indicates the result of the comparison. The comparison here is given hysteresis. It is here assumed that, starting in a state where the feedback voltage Vfb is lower than the reference voltage Vref2 and the control signal SLP is at low level, the comparator 19 outputs a high-level control signal SLP when the feedback voltage Vfb becomes higher than the reference voltage Vref2, and that, thereafter, the comparator 19 turns the level of the control signal SLP from high level to low level when the feedback voltage Vfb becomes lower than the voltage (Vref2−ΔHYS2). The voltage (Vref2−ΔHYS2) is a voltage that is lower than reference voltage Vref2 by a positive hysteresis voltage ΔHYS2.

Overvoltage detection comparators 20 and 21 are each a comparator for detecting an overvoltage condition (a condition where the output voltage Vout is excessively high). The overvoltage detection comparators 20 and 21 together with an OR circuit 22 constitute an overvoltage detection circuit.

The overvoltage detection comparator 20 compares the feedback voltage Vfb, which is fed to the non-inverting input terminal of the comparator 20, with a reference voltage Vref3, which is fed to the inverting input terminal of the comparator 20, and outputs a signal Sig20 that indicates the result of the comparison. The comparison here is given hysteresis. It is here assumed that, starting in a state where the feedback voltage Vfb is lower than the reference voltage Vref3 and the signal Sig20 is at low level, the comparator 20 outputs a high-level signal Sig20 when the feedback voltage Vfb becomes higher than the reference voltage Vref3, and that, thereafter, the comparator 20 turns the level of the signal Sig20 from high level to low level when the feedback voltage Vfb becomes lower than the voltage (Vref3−ΔHYS3). The voltage (Vref3−ΔHYS3) is a voltage that is lower than the reference voltage Vref3 by a positive hysteresis voltage ΔHYS3.

The overvoltage detection comparator 21 compares the output voltage Vout, which is fed to the non-inverting input terminal of the overvoltage detection comparator 21, with a reference voltage Vref4, which is fed to the inverting input terminal of the overvoltage detection comparator 21, and outputs a signal Sig21 that indicates the result of the comparison. The comparison here is given hysteresis. It is here assumed that, starting in a state where the output voltage Vout is lower than the reference voltage Vref4 and the signal Sig21 is at low level, the comparator 21 outputs a high-level signal Sig21 when the output voltage Vout becomes higher than the reference voltage Vref4, and that, thereafter, the comparator 21 turns the level of the signal Sig21 from high level to low level when the output voltage Vout becomes lower than the voltage (Vref4−ΔHYS4). The voltage (Vref4−ΔHYS4) is a voltage that is lower than the reference voltage Vref4 by a positive hysteresis voltage ΔHYS4.

The OR circuit 22 produces the OR (logical sum) signal of the signals Sig20 and Sig21, and outputs it as a control signal OVP_DET. That is, the OR circuit 22 outputs a high-level control signal OVP_DET when at least one of the signals Sig20 and Sig21 is at high level, and outputs a low-level control signal OVP_DET only when the signals Sig20 and Sig21 are both at low level. It can be said that a high-level signal Sig20, a high-level signal Sig21, and a high-level control signal OVP_DET are all signals that indicate an overvoltage condition, that is, a condition in which the output voltage Vout is excessively high. It can be said that the overvoltage detection circuit composed of the comparators 20 and 21 and the OR circuit 22 checks, based on the feedback voltage Vfb or the output voltage Vout, whether or not the output voltage Vout is in an overvoltage condition and, if the output voltage Vout is in an overvoltage condition, outputs an overvoltage detection signal that indicates the condition. A high-level signal Sig20, a high-level signal Sig21, and a high-level control signal OVP_DET can all be considered to belong to a kind of overvoltage detection signal. A low-level signal Sig20, a low-level signal Sig21, and a low-level control signal OVP_DET can be considered to be signals that indicate that the output voltage Vout is not in an overvoltage condition. The control signals SLP and OVP_DET are fed to the logic circuit 17. How the logic circuit 17 operates according to the control signals SLP and OVP_DET will be described in detail later.

The reference voltage Vref3 is set at a voltage higher than the reference voltage Vref2 so that, while the feedback voltage Vfb is in the process of monotonically rising, first the feedback voltage Vfb becomes higher than the reference voltage Vref2, and then the feedback voltage Vfb becomes higher than the reference voltage Vref3. The reference voltage Vref4 is still higher than the reference voltage Vref3, and in addition is higher than the above-mentioned target voltage Vtg. The hysteresis voltages ΔHYS2 to ΔHYS4 may be different from each other, but are here assumed to be equal to each other.

The reverse current forcing circuit 23 is connected to the error signal line LN1. When the control signal OVP_DET is at high level, the reverse current forcing circuit 23 operates so as to lower the voltage value of the error voltage signal Vcmp on the error signal line LN1 down to the lower-limit voltage value determined by the clamp circuit 18 irrespective of the error current signal Ia output from the error amplifier 11. The lower-limit voltage value here equals Vmin1 when the clamp circuit 18 is in the regular clamp state, and equals Vmin2 when the clamp circuit 18 is in the expanded clamp state.

Specifically, for example, the reverse current forcing circuit 23 is a serial circuit composed of a constant current circuit 23*a* and an N-channel MOSFET 23*b* inserted between the error signal line LN1 and a power terminal 24 to which a voltage lower than the voltage value Vmin2 is applied, and the gate of the N-channel MOSFET 23*b* is fed with the control signal OVP_DET. When the control signal OVP_DET is at high level, the constant current circuit 23*a* operates so as to pass a constant current from the error signal line LN1 toward the power terminal 24 via the N-channel MOSFET 23*b*, with the result that the error voltage signal Vcmp falls quickly down to the lower-limit voltage value determined by the clamp circuit 18. For this to take place, the magnitude of the current that the constant current circuit 23*a* retrieves from the error signal line LN1 is set to be sufficiently higher than the maximum value of the current that the error amplifier 11 can deliver toward the error signal line LN1. When the control signal OVP_DET is at low level, the reverse current forcing circuit 23 is non-active. With the reverse current forcing circuit 23 non-active, the electrical path between the error signal line LN1 and the power terminal 24 is cut off, and the constant current circuit 23*a* neither inputs nor outputs a current to or from the error signal line LN1.

The first embodiment includes Practical Examples EX_1 to EX_3 presented below. For convenience' sake, the features of the first embodiment described thus far will be treated as the basic practical example. Unless otherwise stated or unless inconsistent, any description of the basic practical example applies to Practical Examples EX_1 to EX_3 presented below. For any description of those practical examples that contradicts that of the basic practical example, the description of the practical examples prevails. Unless inconsistent, any description of any one of Practical Examples EX_1 to EX_3 applies to any other of them (that is, any two or more of those practical examples may be combined together).

Practical Example EX1_1

Practical Example EX1_1 will be described. Practical Example EX1_1 deals with, on the assumption that the control signal OVP_DET is held at low level, light-load control performed in the switching power supply device 1. When the control signal OVP_DET is held at low level, the clamp circuit 18 is in the regular clamp state (see FIG. 3A).

Figure 4:
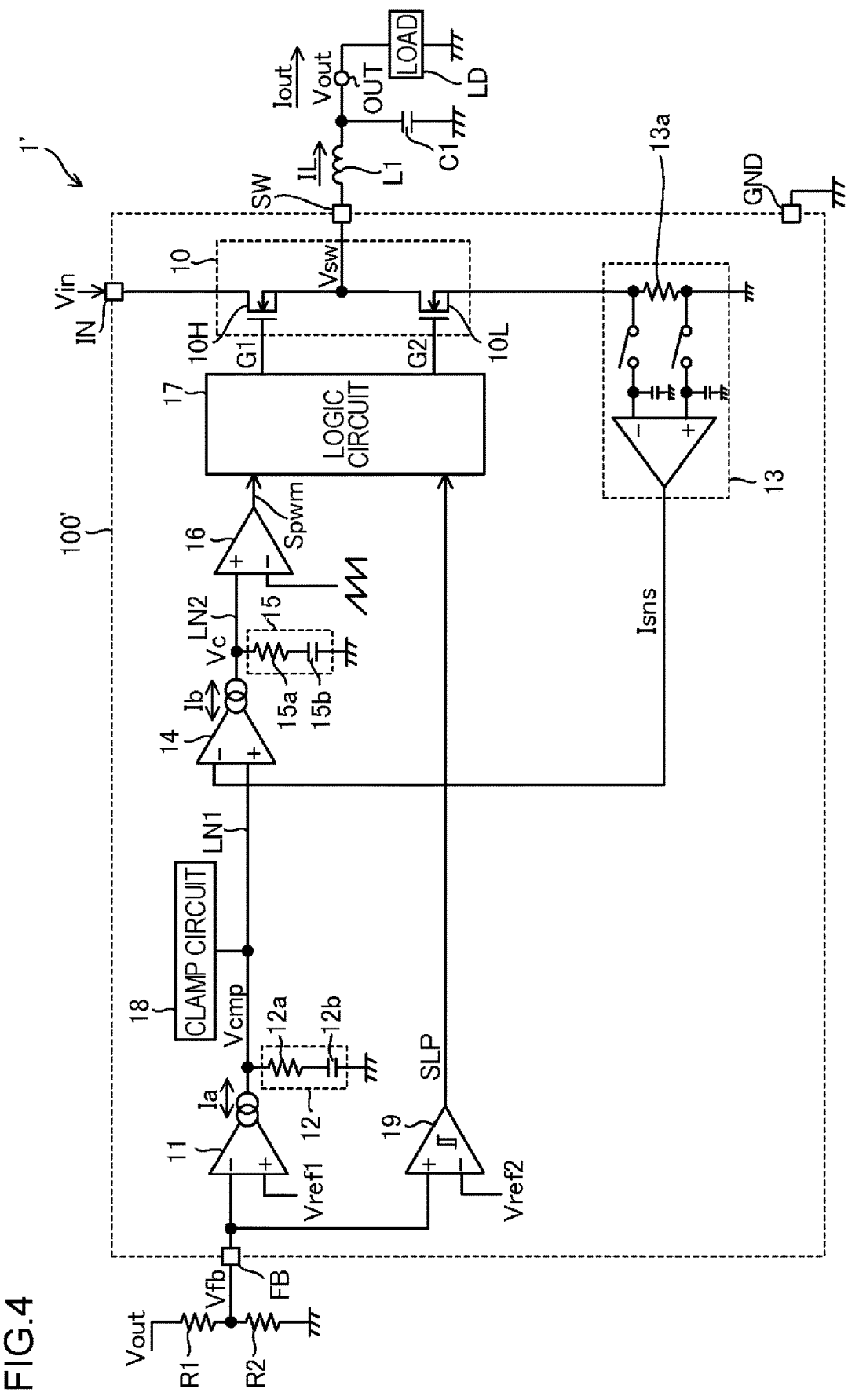
FIG. 4 is an overall configuration diagram of a reference switching power supply device for comparison with the switching power supply device of FIG. 1.

On the assumption that the control signal OVP_DET is held at low level, the switching power supply device 1 can be said to be identical with a reference switching power supply device 1' as shown in FIG. 4. The reference switching power supply device 1' includes, as the switching power supply IC 100, a switching power supply IC 100'. In IC 100', compared with the IC 100, the comparators 20 and 21, the OR circuit 22, and the reverse current forcing circuit 23 are omitted, and the clamp circuit 18 in the IC 100' is in the regular clamp state (see FIG. 3A) all the time.

Light-load control is the control that is performed when the load is light (that is, when the electric power consumed by the load LD is accordingly low). Light-load control involves coil current limiting control, whereby the lower limit is set on the error voltage signal Vcmp and thereby the minimum current of the coil current IL is limited so as not to fall below zero, and sleep control (switching suspension control), whereby switching operation is stopped when, as a result of the coil current limiting control, the output voltage Vout has risen to a predetermined voltage (corresponding to $Vth_H$ in FIG. 5) higher than the target voltage Vtg.

Figure 5:
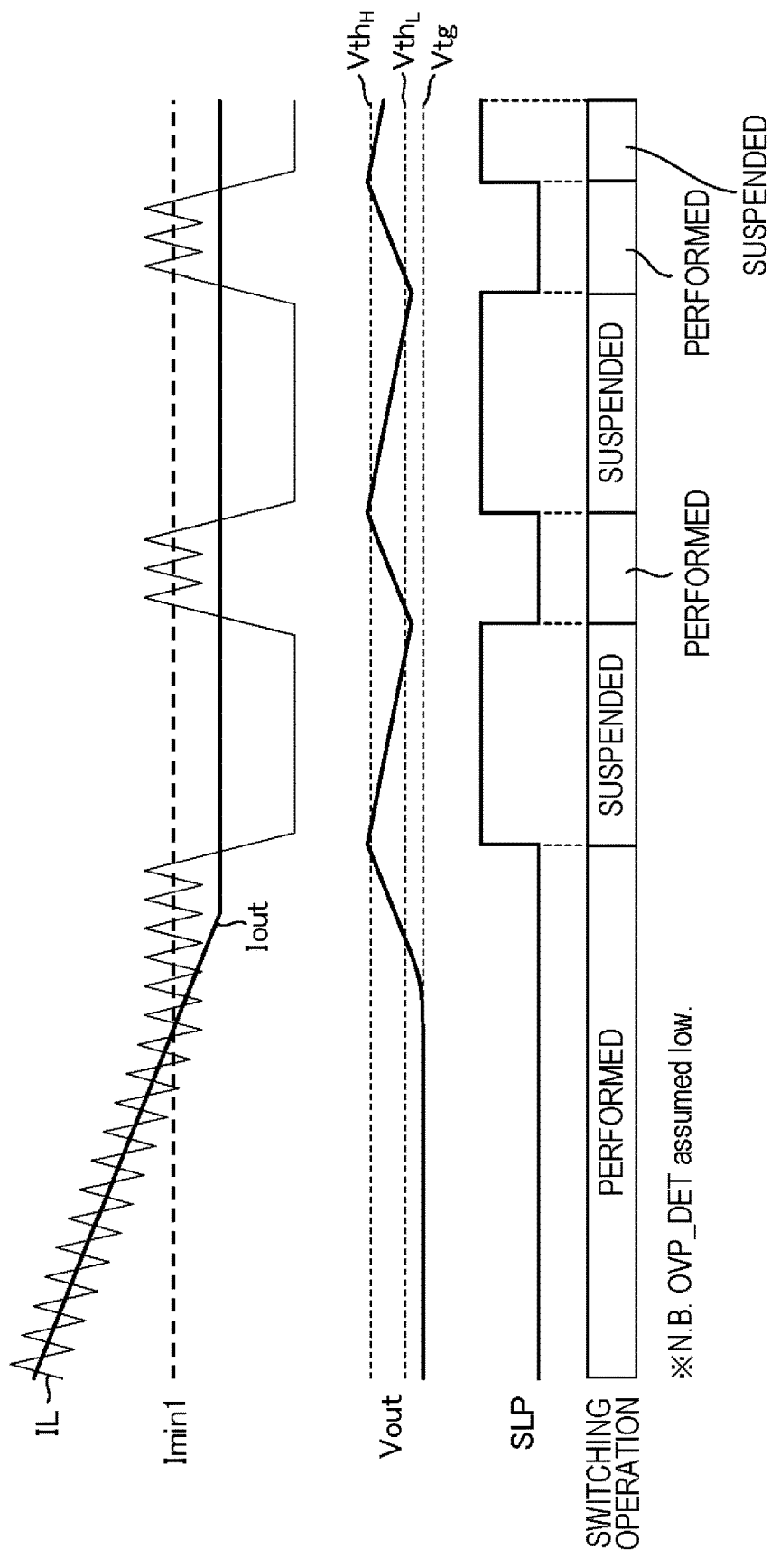
FIG. 5 is a diagram illustrating light-load control in the first embodiment of the present invention.

FIG. 5 is a waveform diagram depicting the operation for light-load control. When switching operation is being performed, the coil current IL varies with the switching period. All the waveforms (in particular, the waveform of the coil current IL) shown in FIG. 5 are schematic, and the actual waveforms can differ from them. It is assumed that, when the output voltage Vout equals the predetermined voltage $Vth_H$, the feedback voltage Vfb equals the reference voltage Vref2 and that, when the output voltage Vout equals a predetermined voltage $Vth_L$, the feedback voltage Vfb equals the voltage (Vref2−ΔHYS2).

Consider a situation where, starting in a state in which the control signal SLP is at low level and switching operation is being performed, the power consumed by the load LD keeps decreasing toward considerably low power (that is, a situation where the load LD is keeps becoming lighter and lighter). In this situation, through output feedback control, the error amplifier 11 keeps lowering the error voltage signal Vcmp and accordingly the coil current IL keeps lowering. When the voltage value of the error voltage signal Vcmp lowers down to the lower-limit voltage value Vmin1 corresponding to the lower-limit current value Imin1, further lowering of the error voltage signal Vcmp is limited, with the result that the coil current IL is held around the lower-limit current value Imin1. That is, to prevent a reverse current, the lowering of the coil current IL (specifically, the average value of the coil current IL during a switching period) is limited to down to the lower-limit current value Imin1, which is larger than zero.

Even when the coil current IL lowers down to the lower-limit current value Imin1, if the power delivered from the switching output stage 10 toward the output terminal OUT is higher than the power consumed by the load LD, the output voltage Vout keeps rising beyond the target voltage Vtg until, when the output voltage Vout reaches the predetermined voltage $Vth_H$, the control signal SLP is turned from low level to high level. The logic circuit 17 performs sleep control (switching suspension control), whereby switching operation is suspended when the control signal SLP is at high level. Suspension of switching operation refers to keeping the transistors 10H and 10L both in the off-state irrespective of the output of the PWM comparator 16.

With switching operation suspended, the output voltage Vout keeps lowering, and when the output voltage Vout lowers down to the predetermined voltage $Vth_L$, which is lower than the predetermined voltage $Vth_H$, the control signal SLP turns from high level to low level. In response to the control signal SLP turning from high level to low level, the logic circuit 17 restarts switching operation.

Thereafter, so long as a light-load condition (that is, a condition where, during switching operation, even when the coil current IL lowers down to the lower-limit current value Imin1, the output voltage Vout keeps rising) persists, switching operation is suspended and restarted repeatedly so that the output voltage Vout varies back and forth largely between the voltages $Vth_H$ and $Vth_L$. A high-level control signal SLP serves as a signal that indicates that the switching power supply device 1 is in a light-load condition. Through light-load control as described above, switching operation is performed intermittently in a light-load condition. It is thus possible to reduce switching loss and thereby improve efficiency.

However, if some fault occurs in the switching power supply device 1' of FIG. 4, depending on the type of the fault, the output voltage Vout may keep rising abnormally. If, on occurrence of such a fault, an abnormal rise of the output voltage Vout cannot be stopped, the load LD can no longer be operated normally or the load LD can be damaged. For convenience' sake, a fault that can cause an abnormal rise of the output voltage Vout in the switching power supply device 1' of FIG. 4 will be referred to as a particular fault. Particular faults include a short circuit to a supply voltage (supply-voltage short circuit), a leak in the output transistor 10H, and an open fault in an electrical path for delivering a voltage commensurate with the output voltage Vout.

In the switching power supply device 1, when a particular fault is occurring, to prevent an abnormal rise of the output voltage Vout, the control signal OVP_DET is used in the following manner.

FIG. 6 shows the relationship of the levels of the control signals SLP and OVP_DET with whether or not switching operation is performed and the like. So long as no fault is present, depending on the heaviness of the load LD, the control signal SLP either remains at low level or varies between high level and low level as shown in FIG. 5.

When the control signals SLP and OVP_DET are both at low level, the logic circuit 17 performs first control in which it performs switching operation and in addition keeps the clamp circuit 18 in the regular clamp state. Meanwhile, the error voltage signal Vcmp is controlled according to the output of the error amplifier 11.

When the control signal SLP is at high level and in addition the control signal OVP_DET is at low level, the logic circuit 17 performs second control (sleep control) in which it suspends switching operation. In this control, the state of the clamp circuit 18 has no effect on the coil current IL or the output voltage Vout, and thus whether it is in the regular clamp state or in the expanded clamp state does not matter. Meanwhile, the error voltage signal Vcmp is controlled according to the output of the error amplifier 11. With switching operation suspended in the second control, however, the error voltage signal Vcmp has no effect on the coil current IL or the output voltage Vout.

A supply-voltage short circuit or a leak in the output transistor 10H can keep the control signals SLP and OVP_DET both at high level. When the control signals SLP and OVP_DET are both at high level, the logic circuit 17 performs third control in which it performs switching operation and in addition keeps the clamp circuit 18 in the expanded clamp state. Meanwhile, owing to the control signal OVP_DET being at high level, the reverse current forcing circuit 23 operates, so that, irrespective of the error current signal Ia output from the error amplifier 11, the voltage value of the error voltage signal Vcmp is forcibly kept at Vmin2. That is, in the third control, switching operation is performed in such a manner as to permit the coil current IL to become negative (typically, for example, switching operation is performed such that the value of the coil current IL remains equal to Imin2). It is thus possible to eliminate or avoid an overvoltage condition (a specific example of the operation will be given later in connection with Practical Example EX1_2, which will be described later).

In a situation like a breakage in an electrical path for delivering a voltage commensurate with the output voltage Vout (more specifically, for example, when the resistor R1 is broken to be open and the feedback voltage Vfb equals 0 V irrespective of the output voltage Vout), it can occur that the control signal SLP is at low level and in addition the control signal OVP_DET is at high level. When the control signal SLP is at low level and in addition the control signal OVP_DET is at high level, the logic circuit 17 performs fourth control in which it performs switching operation and in addition keeps the clamp circuit 18 in the expanded clamp state. Meanwhile, owing to the control signal OVP_DET being at high level, the reverse current forcing circuit 23 operates, so that, irrespective of the error current signal Ia output from the error amplifier 11, the voltage value of the error voltage signal Vcmp is forcibly kept at Vmin2. That is, in the fourth control, as in the third control, switching operation is performed in such a manner as to permit the coil current IL to become negative (typically, for example, switching operation is performed such that the value of the coil current IL remains equal to Imin2). It is thus possible to eliminate or avoid an overvoltage condition (a specific example of the operation will be given later in connection with Practical Example EX1_3, which will be described later).

On an exceptional basis, however, after the control signal OVP_DET turns from high level to low level (that is, after an overvoltage condition is found to have been eliminated), until a predetermined time $t_{HLD}$ elapses, the logic circuit 17 performs switching operation continuously and in addition keeps the clamp circuit 18 in the expanded clamp state irrespective of whether the control signal SLP is at high level or at low level (the workings and effects of the exceptional operation will be mentioned in connection with Practical Example EX1_2, which will be described later). After the control signal OVP_DET turns from high level to low level, when the predetermined time $t_{HLD}$ elapses, then one of the first to fourth control described above is performed based on the control signals SLP and OVP_DET on a regular basis.

Practical Example EX1_2

Practical Example EX1_2 will be described. Practical Example EX1_2 assumes a situation where, as a particular fault, a supply-voltage short circuit or a leak in the output transistor 10H occurs. A supply-voltage short circuit can be a situation where the input terminal IN is short-circuited to the switching terminal SW or to the output terminal OUT without passing through the output transistor 10H or a situation where the input terminal IN is connected to the switching terminal SW or to the output terminal OUT via a resistive element with a certain resistance value (for example, several tens of ohms to several kilohms) without passing through the output transistor 10H. A leak in the output transistor 10H refers to a fault in which, despite the output transistor 10H being in the off-state, a non-negligible current flows from the input terminal IN to the switching terminal SW via the output transistor 10H. Practical Example EX1_2 assumes that the signal Sig21 remains at low level all the time. Accordingly, in carrying out the technology presented as Practical Example EX1_2, it is possible to consider the overvoltage detection comparator 21 omissible.

FIG. 7 shows an example of the waveforms of the control signals SLP and OVP_DET along with the relevant states such as whether or not switching operation is being performed. As time passes, time points $T_{A1}$, $T_{A2}$, $T_{A3}$, and $T_{A4}$ occur in this order. Before time point $T_{A1}$, no fault whatever, and hence no particular fault, has occurred, and accordingly the control signals SLP and OVP_DET are at low level; thus, switching operation is performed continuously and in addition the clamp circuit 18 is kept in the regular clamp state. At time point $T_{A1}$, however, due to the load LD becoming light, or due to a fault such as a supply-voltage short circuit, only the control signal SLP out of the control signals SLP and OVP_DET turns from low level to high level. Thus, the logic circuit 17 stops switching operation.

Through light-load control involving suspension of switching operation, the output voltage Vout normally lowers so as not to incur an overvoltage condition. In the example of FIG. 7, however, because of a supply-voltage short circuit or the like, at time point $T_{A2}$, the control signal OVP_DET turns from low level to high level. Then, starting at time point $T_{A2}$ (or with no delay after time point $T_{A2}$), the logic circuit 17, while setting the clamp circuit 18 to the expanded clamp state, restarts switching operation. At this time, the value of the signal Vcmp is forcibly made equal to Vmin2, and thus switching operation is performed in such a manner that a negative coil current IL flows; thus, the output voltage Vout is expected to lower. In the example of FIG. 7, at time point $T_{A3}$, the control signal OVP_DET turns from high level to low level, and thereafter, when the predetermined time $t_{HLD}$ elapses, time point $T_{A4}$ is reached. In this case, between time points $T_{A2}$ and $T_{A4}$, irrespective of the level of the control signal SLP, switching operation is performed continuously and in addition the clamp circuit 18 is held in the expanded clamp state. The reverse current forcing circuit 23 operates only during the period in which the control signal OVP_DET is at high level (in FIG. 7, the period between time points $T_{A2}$ and $T_{A3}$). After time point $T_{A4}$, one of the first to fourth control described above is performed based on the control signals SLP and OVP_DET, but in the example of FIG. 7, since, after time point $T_{A1}$, a light-load condition persists and the control signal SLP is held at high level, switching operation is stopped at time point $T_{A4}$.

Figure 8:
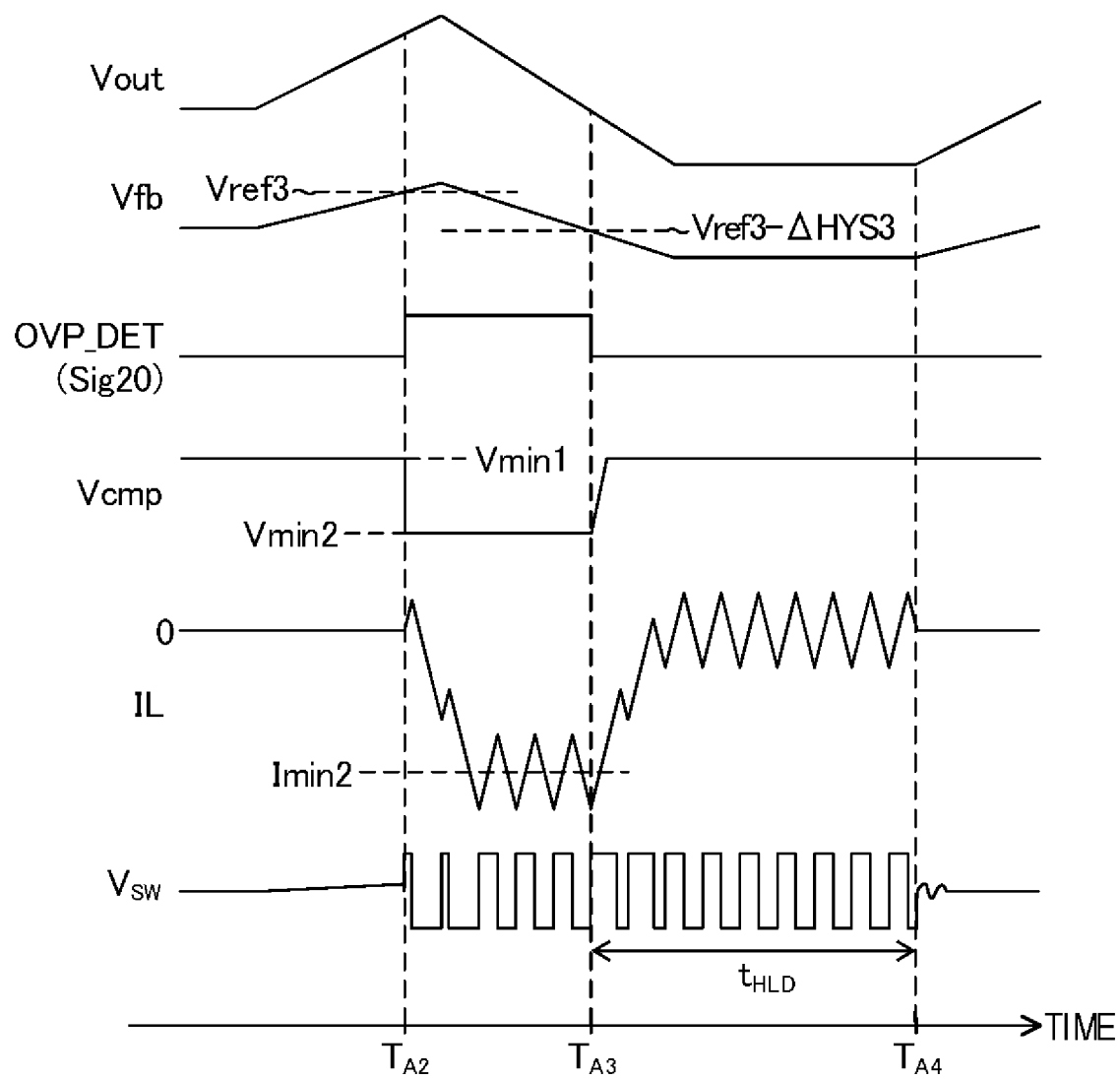
FIG. 8 is a diagram showing signal waveforms on occurrence of a particular fault in Practical Example EX1_2 belonging to the first embodiment of the present invention.

FIG. 8 shows some signal waveforms during a period following time point $T_{A1}$ in FIG. 7. All the waveforms (in particular the waveforms of the coil current IL and the switching voltage Vsw) shown in FIG. 8 are schematic, and the actual waveforms can differ from them.

After time point $T_{A1}$, through light-load control involving suspension of switching operation, the output voltage Vout normally lowers so as not to incur an overvoltage condition. In the example of FIG. 8, however, because of a supply-voltage short circuit or the like, the output voltage Vout keeps rising until, at time point $T_{A2}$, the feedback voltage Vfb reaches the reference voltage Vref3. Then, the signal Sig20 turns from low level to high level, with the result that the control signal OVP_DET turns from low level to high level. After time point $T_{A1}$, until time point $T_{A2}$, through light-load control based on a high-level control signal SLP, switching operation is suspended and moreover, due to the feedback voltage Vfb being accordingly high, the signal Vcmp is lowered by the error amplifier 11 down to the lower limit (Vmin1) of the regular variable range determined by the clamp circuit 18. Between time points $T_{A1}$ and $T_{A2}$, since switching operation is suspended, the coil current IL equals zero.

When, at time point $T_{A2}$, the control signal OVP_DET turns from low level to high level, the logic circuit 17, while setting the clamp circuit 18 to the expanded clamp state, restarts switching operation. At this time, in response to a high-level control signal OVP_DET, the reverse current forcing circuit 23 operates, with the result that the value of the signal Vcmp is forcibly made equal to Vmin2. Then, through switching operation starting at time point $T_{A2}$, a negative current flows through the coil L1, so that the output voltage Vout and the feedback voltage Vfb keep lowering (though, immediately after time point $T_{A2}$, the output voltage Vout and the feedback voltage Vfb may transiently rise for a short period).

In the example of FIG. 8, immediately after time point $T_{A2}$, as a result of the value of the signal Vcmp being made equal to Vmin2, switching operation is restarted with a sufficiently low on-duty, and the coil current IL, through a transient response in which it keeps lowering toward the lower-limit current value Imin2 corresponding to the lower-limit voltage value Vmin2, stabilizes largely at the lower-limit current value Imin2. Thereafter, at time point $T_{A3}$, the feedback voltage Vfb lowers to below the voltage (Vref3−ΔHYS3).

Then, at time point $T_{A3}$, the signal Sig20 turns from high level to low level, with the result that the control signal OVP_DET turns from high level to low level. Thereafter, when the predetermined time $t_{HLD}$ elapses, the time point $T_{A4}$ is reached. Between the time points $T_{A2}$ and $T_{A4}$, irrespective of the level of the control signal SLP, switching operation is performed continuously and in addition the clamp circuit 18 is held in the expanded clamp state. During the period between time points $T_{A3}$ and $T_{A4}$ in which the control signal OVP_DET is at low level, the reverse current forcing circuit 23 does not operate, and thus output feedback control that tends to stabilize the output voltage Vout at the desired target voltage Vtg (output feedback control in which the signal Vcmp is determined according to the output voltage Vout) operates. Thus, the coil current IL rises starting at the lower-limit current value Imin2.

In the example of FIG. 8, it is assumed that the current that flows from the input terminal IN into the capacitor C1 due to a supply-voltage short circuit or a leak in the output transistor 10H is largely equal to the current that flows from the capacitor C1 to the load LD. Accordingly, through the transient response immediately after time point $T_{A3}$, at least immediately before time point $T_{A4}$, the coil current IL is stabilized around zero (because, as a result of the coil current IL becoming close to zero, the output voltage Vout stabilizes at the target voltage Vtg).

After time point $T_{A4}$, one of the first to fourth control described above is performed based on the control signals SLP and OVP_DET; in the example of FIG. 8 (see also FIG. 7 corresponding to FIG. 8), it is assumed that, after time point $T_{A1}$, a light-load condition persists and the control signal SLP is held at high level, and thus, at time point $T_{A4}$, switching operation is suspended. If, at time point $T_{A4}$, unlike in the example of FIG. 8, the control signal SLP is at low level, then even after time point $T_{A4}$, switching operation is performed continuously.

Thus, in this practical example, on detection of an overvoltage condition, switching operation is restarted while the signal Vcmp is forcibly lowered down to Vmin corresponding to a negative coil current IL (a switch is made from light-load control involving suspension of switching operation to PWM control). In this way, it is possible to lower the output voltage Vout and eliminate the overvoltage condition.

To be noted here is that, when a negative coil current IL is passed, an excessively large absolute value of the coil current IL may cause deterioration of the coil L1 or the transistor 10L. Thus, the magnitude of the current retrieved from the capacitor C1 should be limited adequately. In this respect, in the switching power supply device 1, where the voltage signal Vcmp for passing the negative coil current IL is set adequately (Vmin2 is determined so as not to cause such deterioration), deterioration as mentioned above can be suppressed.

Stopping switching operation at time point $T_{A3}$ means stopping it when the coil current IL has a large absolute value. At that time, the coil current IL having the large absolute value flows toward the input terminal IN via the parasitic diode formed in parallel with the source-drain channel of the output transistor 10H. Passing so large a current through the parasitic diode damages the transistor 10H, leading to its deterioration. Moreover, the high current through the parasitic diode can adversely affect the operation of the circuits around the transistor 10H within the IC 100 (can cause undesirable parasitic operation). By making a switch to light-load control after the lapse of the predetermined time $t_{HLD}$ after the switch of the control signal OVP_DET from high level to low level as described above, it is possible to prevent deterioration of the transistor as well as parasitic operation.

Coping with a particular fault (such as a leak in the output transistor 10H) that may occur in Practical Example EX1_2 does not necessarily require the reverse current forcing circuit 23. This is because, on occurrence of a leak in the output transistor 10H, even without the reverse current forcing circuit 23, in response to a rise of the feedback voltage Vfb, the error amplifier 11 can lower the voltage of the signal Vcmp on the error signal line LN1 down to the lower-limit voltage value determined by the clamp circuit 18. This achieves protective operation equivalent to the protective operation shown in FIG. 8.

Figure 9:
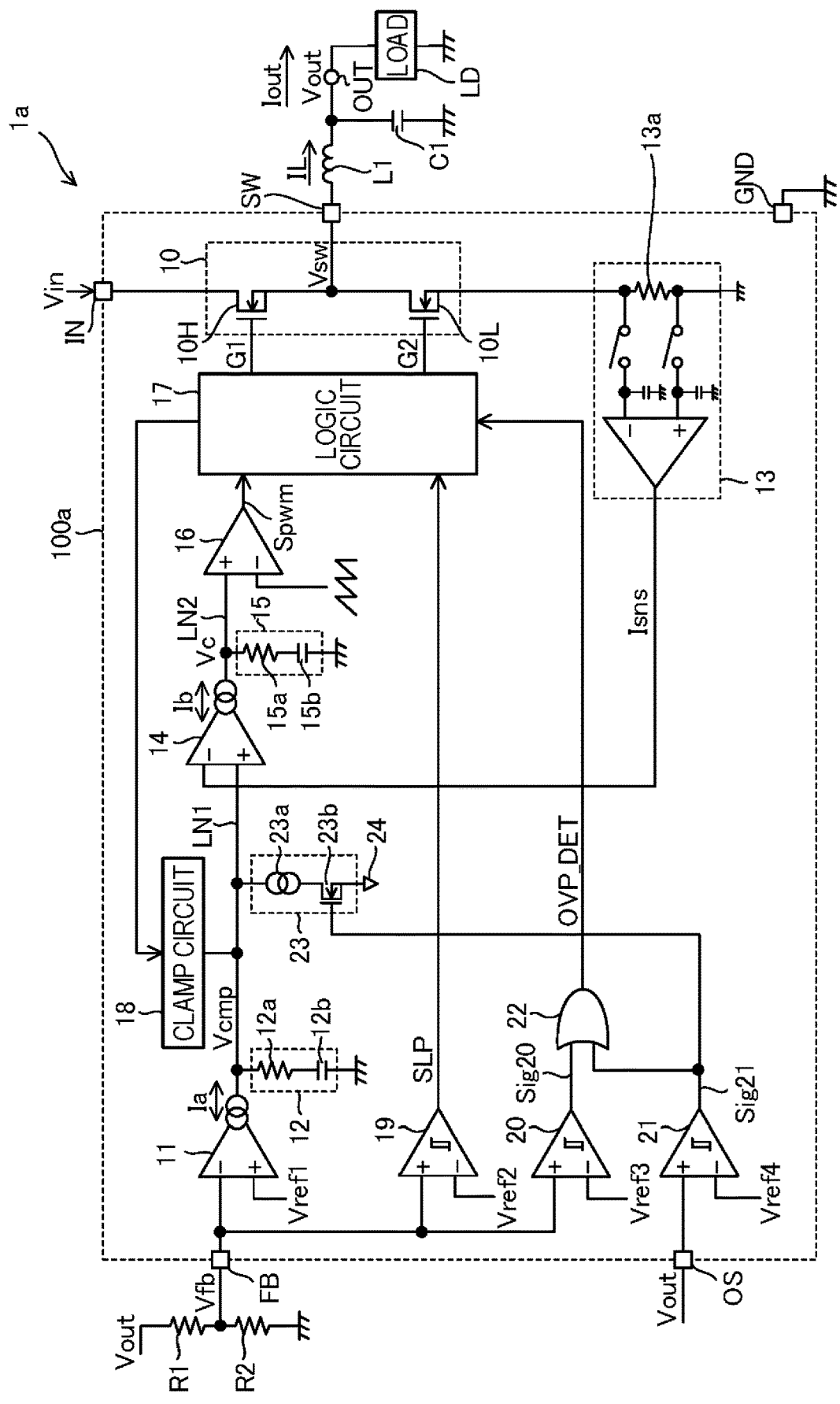
FIG. 9 is a modified overall configuration diagram of a switching power supply device in Practical Example EX1_2 belonging to the first embodiment of the present invention.

Thus, as shown in FIG. 9, whether or not to operate the reverse current forcing circuit 23 may be controlled according to, instead of the control signal OVP_DET, the signal Sig21. Specifically, for example, a modification may be made such that the gate of the MOSFET 23b is fed with, instead of the control signal OVP_DET, the signal Sig21. A switching power supply device 1 and a switching power supply IC 100 that have that modification applied to them will be identified by the reference signs "1a" and "100a" respectively. In the switching power supply IC 100a, when the signal Sig21 is at high level, the constant current circuit 23a so operates as to pass a current from the error signal line LN1 toward the power terminal 24 via the MOSFET 23b. As a result, while the signal Vcmp quickly lowers down to the lower-limit voltage value determined by the clamp circuit 18, if the signal Sig21 is at low level, the reverse current forcing circuit 23 remains non-active. That is, in the switching power supply IC 100a, the reverse current forcing circuit 23 operates when not the control signal OVP_DET but the signal Sig21 is at high level, and so operates as to lower the voltage value of the error voltage signal Vcmp on the error signal line LN1 down to the lower-limit voltage value determined by the clamp circuit 18 irrespective of the error current signal Ia output from the error amplifier 11.

The reverse current forcing circuit 23 is required on occurrence of a fault that may occur in Practical Example EX1_3, which will be described later. In the switching power supply IC 100 of FIG. 1, with consideration given to a fault that may occur in Practical Example EX1_3, which will be described later, the control signal OVP_DET is fed to the reverse current forcing circuit 23, and this helps simplify the entire system.

Practical Example EX1_3

Practical Example EX1_3 will be described. Practical Example EX1_3 pays particular attention to, as a particular fault, an open fault in an electrical path for delivering a voltage commensurate with the output voltage Vout. On occurrence of such a fault, depending on the location and the mode of the fault, the output voltage Vout may rise abnormally. To avoid that, in the switching power supply device 1 of FIG. 1, separately from the comparator 20, the comparator 21 for directly monitoring the output voltage Vout is provided, so that the comparators 20 and 21 both monitor for an overvoltage.

Figure 10:
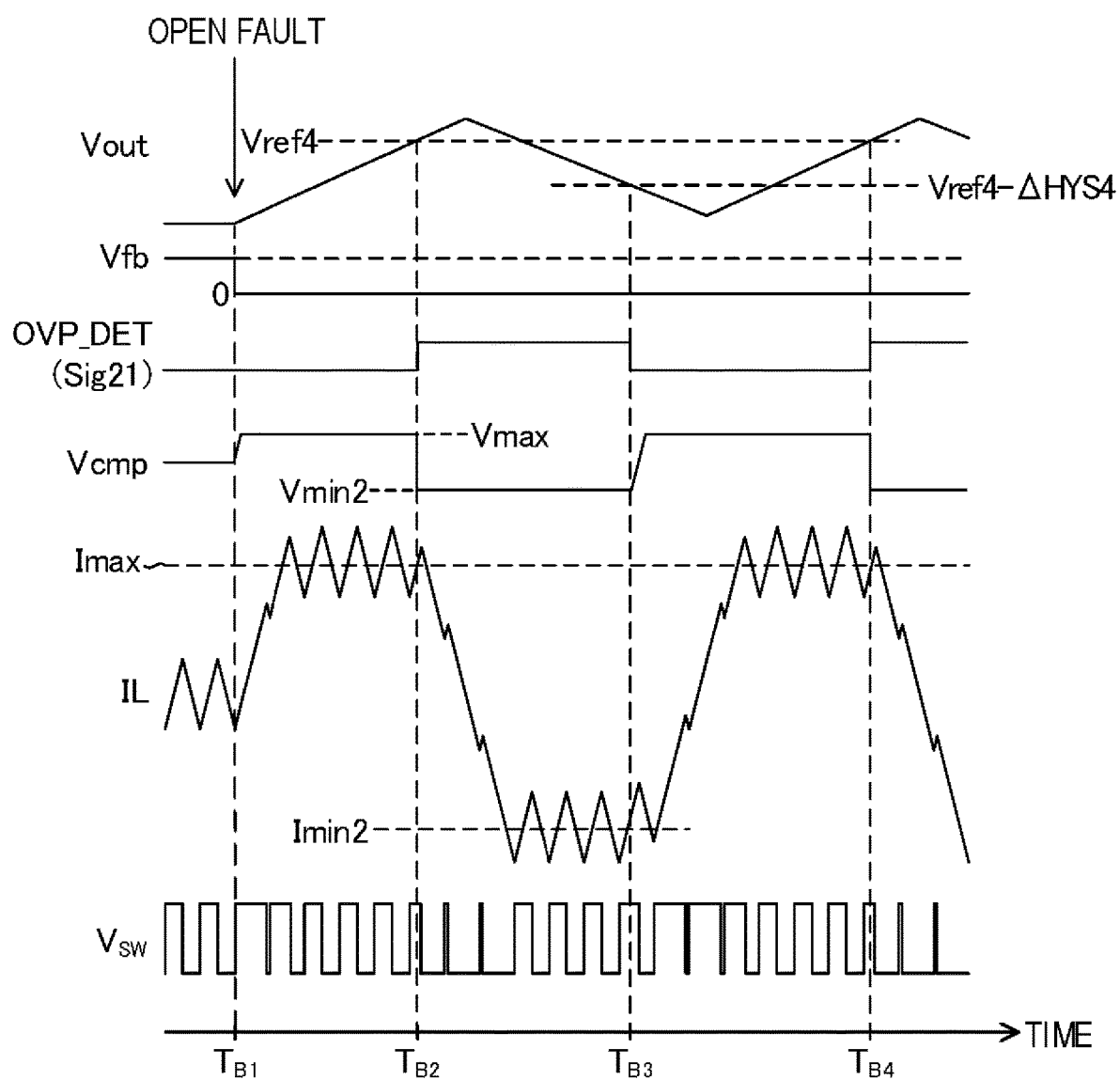
FIG. 10 is a diagram showing signal waveforms on occurrence of a particular fault in Practical Example EX1_3 belonging to the first embodiment of the present invention.

With reference to FIG. 10, the operation of the switching power supply device 1 on occurrence of an open fault as mentioned above will now be described. As time passes, time points $T_{B1}$, $T_{B2}$, $T_{B3}$, and $T_{B4}$ occur in this order. It is assumed that, before time point $T_{B1}$, no fault whatever, and hence no particular fault, has occurred and accordingly the control signals SLP and OVP_DET are both at low level, and thus that switching operation is performed continuously and in addition the clamp circuit 18 is kept in the regular clamp state. It is also assumed that, before time point $T_{B1}$, between time points $T_{B1}$ and $T_{B4}$, and after time point $T_{B4}$, the control signal SLP is held at low level, and thus that switching operation is performed all the time.

Consider a case where, at time point $T_{B1}$, a fault such as the resistor R1 being broken open or dropping off the pattern occurs and thereafter the voltage at the feedback terminal FB is held at 0 V. The inverting input terminal of the error amplifier 11 and the non-inverting input terminals of the comparators 19 and 20 are connected to the feedback terminal FB, and on the assumption that the voltage at the feedback terminal FB equals the feedback voltage Vfb commensurate with the output voltage Vout, the error amplifier 11 and the comparators 19 and 20 generate and output the signals Ia, SLP, and Sig20 respectively. After time point $T_{B1}$, the feedback terminal FB is fed with a voltage of 0 V, which is not based on the output voltage Vout, and thus the output signals of the comparators 19 and 20 (SLP and Sig20) are held at low level.

When the voltage at the feedback terminal FB becomes equal to 0 V, the error amplifier 11 operates such that the error voltage signal Vcmp keeps rising, but the rise of the error voltage signal Vcmp is limited to up to the upper-limit voltage value Vmax. In coordination with this, the coil current IL keeps increasing, but the rise of the coil current IL is limited to up to the upper-limit current value Imax.

Through control not based on the output voltage Vout, the coil current IL increases, with the result that the output voltage Vout keeps rising until, at time point $T_{B2}$, the output voltage Vout reaches the reference voltage Vref4. Then, the signal Sig21 turns from low level to high level, with the result that the control signal OVP_DET turns from low level to high level.

At time point $T_{B2}$, when the control signal OVP_DET turns from low level to high level, the logic circuit 17 sets the clamp circuit 18 to the expanded clamp state. Moreover, in response to a high-level control signal OVP_DET, the reverse current forcing circuit 23 operates, with the result that the value of the signal Vcmp is forcibly made equal to the lower-limit voltage value Vmin2. Then, through switching operation starting at time point $T_{B2}$, a negative current flows through the coil L1, and the output voltage Vout keeps lowering (though, immediately after time point $T_{B2}$, the output voltage Vout may transiently rise for a short period).

In the example of FIG. 10, immediately after time point $T_{B2}$, as a result of the value of the signal Vcmp being made equal to Vmin2, switching operation is performed with a sufficiently low on-duty, and the coil current IL, through a transient response in which it keeps lowering toward the lower-limit current value Imin2 corresponding to the lower-limit voltage value Vmin2, stabilizes largely at the lower-limit current value Imin2. Thereafter, at time point $T_{B3}$, the output voltage Vout lowers to below the voltage (Vref4−ΔHYS4).

Then, at time point $T_{B3}$, the signal Sig21 turns from high level to low level, with the result that the control signal OVP_DET turns from high level to low level. When the control signal OVP_DET turns to low level, the reverse current forcing circuit 23 becomes non-active; thus, the value of the signal Vcmp quickly rises back up to the upper-limit voltage value Vmax, and in coordination with that, the coil current IL increases to the upper-limit current value Imax. As the coil current IL increases, the output voltage Vout keeps rising back until, at time point $T_{B4}$, the output voltage Vout reaches the reference voltage Vref4. Thereafter, operation similar to that between time points $T_{B1}$ and $T_{B4}$ is repeated.

As described above, in the switching power supply device 1, even in case of, for example, a breakage in an electrical path for delivering a voltage commensurate with the output voltage Vout, it is possible to suppress an abnormal rise of the output voltage Vout. In simply carrying out the technology of Practical Example EX1_3 as implemented as shown in FIG. 10, it is possible to consider the comparator 20 omissible, because it then does not function meaningfully.

Moreover, in Practical Example EX1_3, at time point $T_{B3}$, the clamp circuit 18 can be immediately shifted from the expanded clamp state back to the regular clamp state. This is because, here, unlike in Practical Example EX1_2, no consideration needs to be given to an incident in which, while a large negative coil current IL is flowing, switching operation is stopped. However, in a case where, while the operation in Practical Example EX1_2 is left untouched, a configuration that permits the clamp circuit 18 to be shifted back to the regular clamp state at time point $T_{B3}$ is adopted, then the signals Sig20 and Sig21 need to be fed individually to the logic circuit 17 so that the logic circuit 17 can distinguish which of the comparators 20 and 21 has detected a overvoltage condition. In practice, there is no need to shift the clamp circuit 18 back to the regular clamp state at time point $T_{B3}$; thus, what has to be done is simply performing control similar to that in Practical Example EX1_2 so that the clamp circuit 18 is shifted from the expanded clamp state back to the regular clamp state after the lapse of the predetermined time $t_{HLD}$ after the time point $T_{B3}$.

Second Embodiment

A second embodiment of the present invention will be described. The second embodiment is an embodiment based on the first embodiment. Accordingly, for those features of the second embodiment which are not specifically described, unless inconsistent, the corresponding description of the first embodiment applies to the second embodiment. For any description of the second embodiment that contradicts between the first and second embodiments, the description of the second embodiment prevails.

Figure 11:
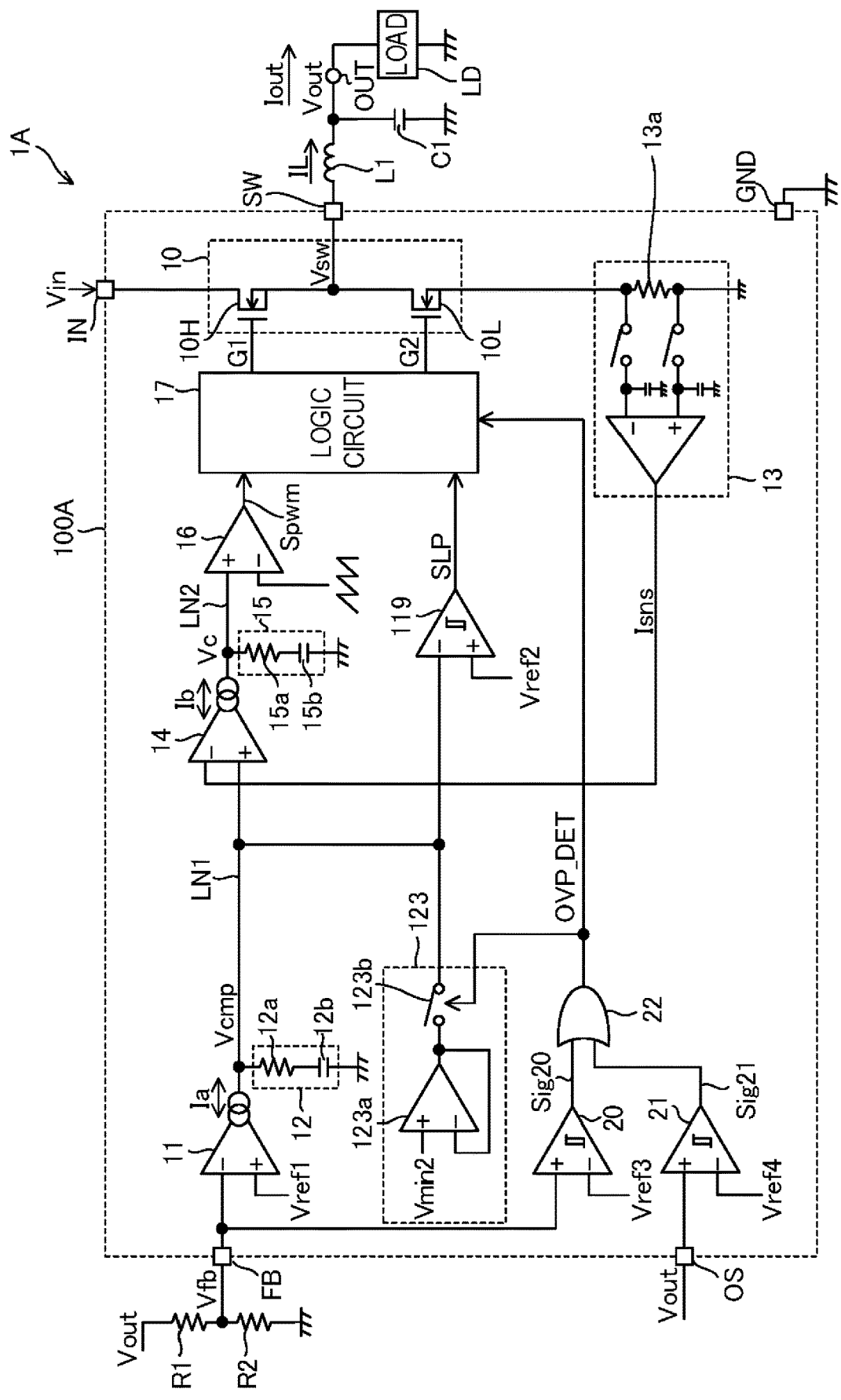
FIG. 11 is an overall configuration diagram of a switching power supply device according to a second embodiment of the present invention.

FIG. 11 is an overall configuration diagram of a switching power supply device 1A according to a second embodiment of the present invention. The switching power supply device 1A of FIG. 11 includes a switching power supply IC 100A and a plurality of discrete components that are externally connected to the switching power supply IC 100A, and these discrete components include a capacitor C1, a coil L1, and resistors R1 and R2.

In the IC 100A, compared with the IC 100 in FIG. 1, the clamp circuit 18 is omitted, and the light-load detection comparator 19 and the reverse current forcing circuit 23 are replaced with a light-load detection comparator 119 and a reverse current forcing circuit 123. Except for the just-mentioned omission and replacement, the IC 100A is identical with the IC 100, and thus the interconnection among the IC 100A, the capacitor C1, the coil L1, and the resistors R1 and R2 is identical with the interconnection among the IC 100, the capacitor C1, the coil L1, and the resistors R1 and R2. In the IC 100A, however, due to the absence of the clamp circuit 18, the logic circuit 17 naturally does not control a clamp circuit 18. When any description of the first embodiment is applied to the second embodiment, the reference signs "1", "100", "19", and "23" are to be read as "1A", "100A", "119", and "123" respectively.

The configuration of the switching power supply device 1A will now be described with focus on the differences between the switching power supply devices 1 and 1A.

Like the comparator 19 in FIG. 1, the comparator 119 is a comparator for detecting a light-load condition, a difference being that the comparator 119 has its inverting input terminal connected to the error signal line LN1. Accordingly, the comparator 119 compares the voltage of the error voltage signal Vcmp, which is fed to the inverting input terminal of the comparator 119, with the reference voltage Vref2, which is fed to the non-inverting input terminal of the comparator 119, and outputs a control signal SLP that indicates the result of the comparison. The comparison here is given hysteresis. It is here assumed that, starting in a state where the voltage of the signal Vcmp is higher than the reference voltage Vref2 and the control signal SLP is at low level, the comparator 119 outputs a high-level control signal SLP when the voltage of the Vcmp becomes lower than the reference voltage Vref2, and that, thereafter, the comparator 119 turns the level of the control signal SLP from high level to low level when the voltage of the signal Vcmp becomes higher than the voltage (Vref2+ΔHYS2). The control signal SLP from the comparator 119 is fed to the logic circuit 17. How the logic circuit 17 operates according to the control signal SLP is the same between the ICs 100 and 100A.

The reverse current forcing circuit 123 is connected to the error signal line LN1. When the control signal OVP_DET is at high level, the reverse current forcing circuit 123 operates so as to forcibly keep the voltage value of the error voltage signal Vcmp on the error signal line LN1 equal to the voltage value Vmin2 irrespective of the error current signal Ia output from the error amplifier 11. The significance of the voltage value Vmin2 is as mentioned in connection with the first embodiment. Thus, when switching operation is performed with the value of the signal Vcmp kept equal to the voltage value Vmin2, the value of the coil current IL is so controlled as to be equal to the current value Imin2.

Specifically, for example, the reverse current forcing circuit 123 is composed of an amplifier 123a that outputs a voltage having the voltage value Vmin2 with a low impedance and a switch 123b that is inserted in series between the output terminal of the amplifier 123a and the line LN1, and the switch 123b is controlled to turn on and off by the control signal OVP_DET. Specifically, when the control signal OVP_DET is at high level, the switch 123b is on; thus, the output terminal of the amplifier 123a is connected to the line LN1, so that the value of the signal Vcmp becomes equal to the voltage value Vmin2. When the control signal OVP_DET is at low level, the output terminal of the amplifier 123a is disconnected from the line LN1; thus, the value of the signal Vcmp is determined by the output signal of the error amplifier 11 (that is, the error current signal Ia).

As described above, the switching power supply device 1A is so configured as to detect a light-load condition based on the error voltage signal Vcmp. In this case, the error signal line LN1 is not provided with a clamp circuit, and accordingly, when overvoltage protection is in effect, the voltage of the signal Vcmp is biased to be an adequate value (Vmin2) via the switch 123b. Also in a configuration like that of the second embodiment, on occurrence of a particular fault as mentioned above, workings similar to those in the first embodiment are obtained.

In a situation where no overvoltage condition is being detected (that is, in a situation where the control signal OVP_DET is at low level), the reference voltage Vref2 with respect to the comparator 119 is so set that no such switching operation as to pass a negative coil current IL is performed. Specifically, when the control signals OVP_DET and SLP are at low level and switching operation is being performed, if in response to the load LD being light the signal Vcmp keeps lowering, output feedback control operates to lower the coil current IL; then, before the coil current IL falls below zero, the voltage of the signal Vcmp becomes lower than the reference voltage Vref2, and thus the control signal SLP turns to high level, so that switching operation is stopped.

Third Embodiment

A third embodiment of the present invention will be described. The third embodiment deals with techniques that can be implemented in combination with the first or second embodiment or modified techniques that can be applied to the first or second embodiment. The third embodiment includes Practical Examples EX3_1 to EX3_6 presented below, of which any one can be combined with any other.

Practical Example EX3_1

Figure 12A:
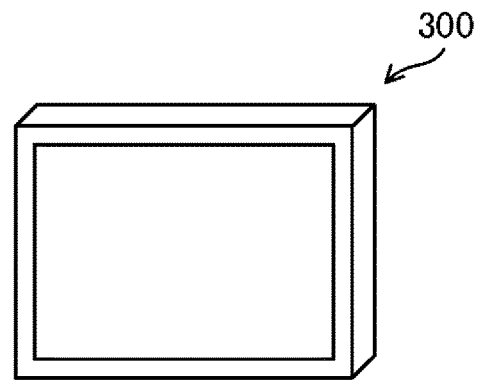
FIGS. 12A and 12B are an external view and an overcall configuration block diagram, respectively, of a car navigation device according to a third embodiment of the present invention.
Figure 12B:
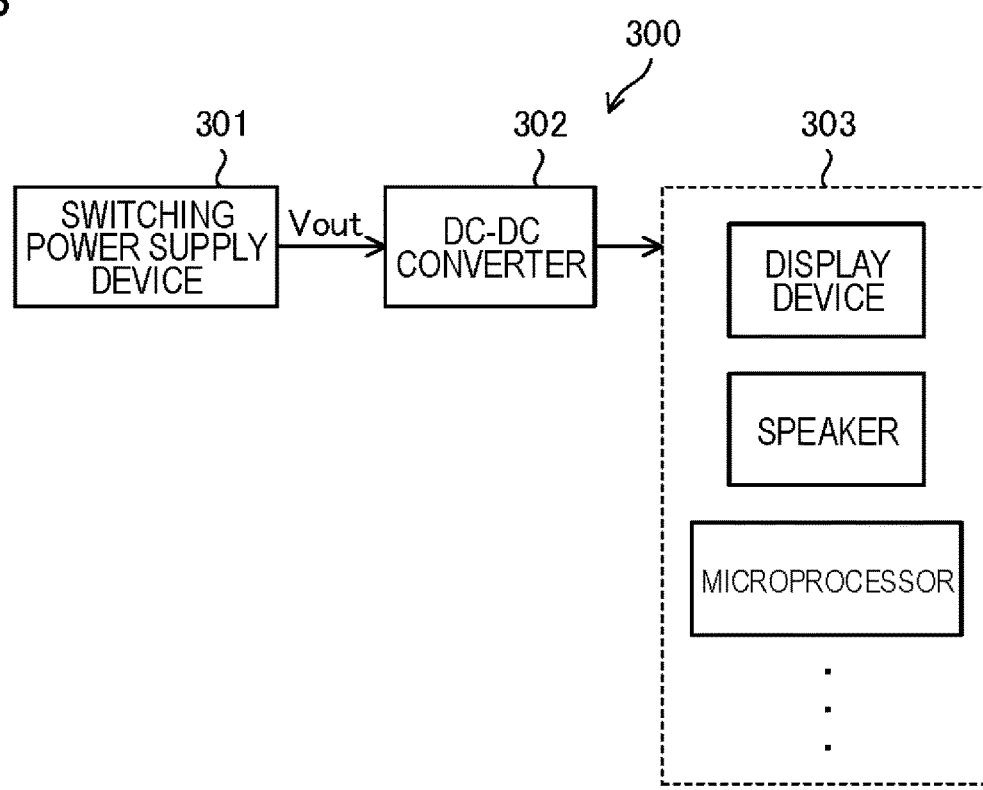

Practical Example EX3_1 will be described. FIG. 12A is an exterior view of a car navigation device 300 according to Practical Example EX3_1, and FIG. 12B is an outline configuration block diagram of the car navigation device 300. The car navigation device 300 includes a switching power supply device 301, a DC-DC converter 302, and a functional block 303. Used as the switching power supply device 301 is the switching power supply device 1 or 1A described previously. The input voltage Vin to the switching power supply device 301 can be supplied from a battery provided on the vehicle in which the car navigation device 300 is incorporated. The DC-DC converter 302 converts the output voltage Vout of the switching power supply device 301 to one or more direct-current voltages with desired voltage values, and supplies the so obtained direct-current voltages to the functional block 303. The functional block 303 operates on the direct-current voltages supplied from the DC-DC converter 302. The functional block 303 includes a plurality of components that carry out the different functions of the car navigation device 300, and includes a display device, a loudspeaker, a microprocessor, and the like. The output voltage of the switching power supply device 301 may be supplied directly to the functional block 303.

In the car navigation device 300, the DC-DC converter 302 and the functional block 303 can be considered to be a load LD to the switching power supply device 301. Needless to say, the switching power supply device 1 or 1A may be incorporated not only in a car navigation device but in any device including any load LD.

Practical Example EX3_2

Practical Example EX3_2 will be described. In the configurations of FIGS. 1 and 11, the current flowing through the transistor 10L is detected, and thereby the coil current IL is detected. The current detector 13 may instead detect the current flowing through the transistor 10H, or directly detect the current flowing through the coil L1, and thereby generate the current sense signal Isns.

Practical Example EX3_3

Practical Example EX3_3 will be described. The light-load detection comparator 19 in FIG. 1, or the light-load detection comparator 119 in FIG. 11, functions as a sleep determiner that detects a light-load condition based on the feedback voltage Vfb, or based on the voltage of a signal generated based on the feedback voltage Vfb (the voltage of the error voltage signal Vcmp) and that, on detecting a light-load condition, outputs a suspension control signal (corresponding to a high-level control signal SLP) for stopping switching operation.

A switching power supply device according to the present invention includes a controller that controls the switching output stage 10 such that the output voltage Vout is stabilized at the predetermined target voltage Vtg based on the feedback voltage Vfb commensurate with the output voltage Vout (in other words, based on the voltage at the feedback terminal FB at which the feedback voltage Vfb is to be received). The controller is considered to include the components identified by the reference signs 11 to 17 in the configurations of FIGS. 1 and 11. In the configuration of FIG. 1, however, the clamp circuit 18 may also be considered to be included among the components constituting the controller.

Practical Example EX3_4

Practical Example EX3_4 will be described. In the ICs 100 and 100A, the feedback terminal FB may be fed directly with the output voltage Vout (except in Practical Example EX1_3). In that case, the feedback voltage Vfb is the output voltage Vout itself. Even when the feedback voltage Vfb is the output voltage Vout itself, all the same, the feedback voltage Vfb is a feedback voltage that is commensurate with the output voltage Vout.

Practical Example EX3_5

Practical Example EX3_5 will be described. The absolute values of the current values Imax and Imin2 mentioned above may be equal to each other, or may differ from each other. With consideration given to the rated current through the coil L1, it is reasonable to make the current values Imax and Imin2 equal or generally equal.

Practical Example EX3_6

Practical Example EX3_6 will be described.

The circuit elements of the ICs 100 and 100A are produced in the form of a semiconductor integrated circuit, and this semiconductor integrated circuit is sealed in a casing (package) made of resin to produce a semiconductor device. A plurality of discrete components may instead be used to build a circuit equivalent to that within the ICs 100 and 100A. One or more (for example, the transistors 10H and 10L) of the circuit elements mentioned above as included in the IC 100 or 100A may be provided outside and be externally connected to the IC 100 or 100A.

For any signal or voltage, unless inconsistent with what is disclosed herein, the relationship of its high and low levels may be reversed.

The transistor 10H may be built as a P-channel MOSFET, in which case performing switching operation as described above requires that the level of the voltage fed to the gate of the transistor 10H be modified from that described above. In any other way, the channel type of any FET may be modified.

Any of the transistors mentioned above may be of any type. For example, the transistors described as MOSFETs above may be replaced with junction FETs, IGBTs (insulated-gate bipolar transistors), or bipolar transistors. Any transistor has a first electrode, a second electrode, and a control electrode. In an FET, one of the first and second electrodes is a drain, and the other is a source, the control electrode being a gate. In in IGBT, one of the first and second electrodes is a collector, and the other is an emitter, the control electrode being a gate. In a bipolar transistor that does not classify into IGBTs, one of the first and second electrodes is a collector, and the other is an emitter, the control electrode being a base.

Studies on the Present Invention

To follow are studies on the present invention as implemented as the embodiments described above.

A switching power supply device $W_A$ according to one aspect of the present invention includes: a switching output stage (10) configured to generate an output voltage (Vout) from an input voltage (Vin) by switching operation; a controller (11-17) configured to control the switching output stage based on a feedback voltage (Vfb) commensurate with the output voltage; a sleep determiner (19, 119) configured to be capable of outputting a suspension control signal (a high-level control signal SLP) based on the feedback voltage or based on the voltage (the voltage of Vcmp) of a signal generated based on the feedback voltage; and an overvoltage detector (20-22) configured to check whether or not the output voltage is in an overvoltage condition based at least on the feedback voltage and to output an overvoltage detection signal (a high-level control signal OVP_DET) when the output voltage is in the overvoltage condition. The controller is configured to be capable of performing switching suspension control in which the controller suspends the switching operation on receiving the suspension control signal and to restart the switching operation on receiving the overvoltage detection signal while performing the switching suspension control.

Enabling switching suspension control makes it possible to suspend switching operation when the load is light and thereby reduce switching loss. However, when a fault such as a supply-voltage short circuit is occurring, even suspending switching operation cannot prevent the output voltage from going into an overvoltage condition. A configuration that restarts switching operation in such a case makes it possible to eliminate or suppress the overvoltage condition by switching operation.

Specifically, for example, in the switching power supply device $W_A$, a coil (L1) can be provided between the switching output stage and a terminal (OUT) to which the output voltage is applied, and the controller can be configured to, on receiving the overvoltage detection signal while performing the switching suspension control, restart the switching operation in a manner that allows a reverse current (a negative coil current IL) to flow from the coil to the switching output stage.

More specifically, for example, in the switching power supply device $W_A$, the switching output stage can include an output transistor (10H) and a synchronous rectification transistor (10L) that are connected in series with each other and that are turned on and off alternately through the switching operation based on the feedback voltage, and the controller includes: an error amplifier (11) configured to output to an error signal line (LN1) an error signal commensurate with the difference between the feedback voltage and a predetermined reference voltage (Vref1); and a coil current detector (13) configured to sense the current through the coil, which is connected in series between the connection node (SW) between the output transistor and the synchronous rectification transistor and the terminal to which the output voltage is applied, to output a current sense signal (Isns) commensurate with the sensed current. The controller can be configured to achieve the switching operation by generating a drive signal (G1, G2) for the switching output stage based on a signal on the error signal line and the current sense signal.

Then, for example, in the switching power supply device $W_A$, there can be further provided a clamp circuit (18) configured to limit the variable range of the signal on the error signal line thereby to limit the variable range of the current through the coil during the switching operation. The lower-limit value of the variable range of the current through the coil can be set at one of a first lower-limit value (Imin1) and a second lower-limit value (Imin2) so that, when the current value in the coil is equal to or larger than the first lower-limit value, a current flows from the connection node toward the coil while, when the current value in the coil equals the second lower-limit value, the reverse current flows from the coil toward the connection node. The controller can be configured to control the clamp circuit such that, before receiving the overvoltage detection signal, the lower-limit value equals the first lower-limit value and that, on and after receiving the overvoltage detection signal, the lower-limit value equals the second lower-limit value.

Then, for example, in the switching power supply device $W_A$, there can be further provided a forcing circuit (23) configured to forcibly set the signal voltage on the error signal line at a voltage (Vmin2) corresponding to the second lower-limit value irrespective of the output of the error amplifier when the overvoltage detection signal is being output.

Here, for example, in the switching power supply device $W_A$, the controller can be configured to, after restarting the switching operation in response to receipt of the overvoltage detection signal during the switching suspension control, on detecting elimination of the overvoltage condition, performs the switching operation continuously for a predetermined time ($t_{HLD}$) irrespective of the output of the sleep determiner and, after a lapse of the predetermined time, to control the clamp circuit such that the lower-limit value returns from the second lower-limit value to the first lower-limit value.

Stopping switching operation based on the output of the sleep determiner while a comparatively high current is flowing through the coil may have an adverse effect, such damage to the transistor constituting the switching output stage. With the configuration described above, it is possible to suppress such an adverse effect.

Specifically, for another example (see FIG. 1), in the switching power supply device $W_A$, the sleep determiner (19) can be configured to output the suspension control signal based on the result of comparison of the feedback voltage with a predetermined sleep determination voltage (Vref2).

For another example (see FIG. 11), in the switching power supply device $W_A$, there can be further provided a forcing circuit (123) configured to forcibly set the signal voltage on the error signal line (LN1) at a predetermined voltage (Vmin2) irrespective of the output of the error amplifier when the overvoltage detection signal is being output. The predetermined voltage can be determined such that, during the switching operation with the signal voltage on the error signal line at the predetermined voltage, the reverse current flows from the coil toward the connection node.

Here, for example (see FIG. 11), in the switching power supply device $W_A$, the sleep determiner (119) can output the suspension control signal based on the result of comparison of the signal voltage on the error signal line with a predetermined sleep determination voltage (Vref2).

A switching power supply device $W_B$ according to another aspect of the present invention includes: a switching output stage (10) configured to generate an output voltage (Vout) from an input voltage (Vin) by switching operation; a first input terminal (FB) at which to receive a feedback voltage (Vfb) resulting from voltage division of the output voltage; a second input terminal (OS) at which to receive the output voltage; a controller (11-17) configured to control the switching output stage based on the voltage at the first input terminal; and an overvoltage detector (20-22) configured to check whether or not the output voltage is in an overvoltage condition based at least on the voltage at the second input terminal and to output an overvoltage detection signal (a high-level control signal OVP_DET) when the output voltage is in the overvoltage condition. A coil (L1) can be provided between the switching output stage and a terminal (OUT) to which the output voltage is applied, and the controller can configured to perform the switching operation in a manner that restricts a reverse current (a negative coil current IL) flowing from the coil to the switching output stage before receiving the overvoltage detection signal and to perform the switching operation in a manner that generates the reverse current on and after receiving the overvoltage detection signal.

In a case where, for example, an open fault occurs between the terminal to which the output voltage is applied and the first input terminal, the switching operation that is supposed to be performed based on the feedback voltage can no longer be performed, and this may cause an abnormal rise of the output voltage. With this taken into consideration, in the switching power supply device $W_B$ configured as described above, on detection of an overvoltage condition based on the voltage at the second input terminal, switching operation is performed in a manner that generates a reverse current. This makes is possible to suppress an excessive rise of the output voltage with a drop of the output voltage resulting from the reverse current.

The embodiments of the present invention allow for many modifications made as necessary within the scope of the technical concept set forth in the appended claims. The embodiments described above are merely examples of how the present invention can be implemented, and the senses of the terms used to define the present invention and its features are not limited to those in which they are used in the description of the embodiments given above. All specific values mentioned in the above description are merely examples, and can naturally be altered to different values.

What is claimed is:

1. A switching power supply device comprising:
    a switching output stage configured to generate an output voltage from an input voltage by switching operation;
    a controller configured to control the switching output stage based on a feedback voltage commensurate with the output voltage;
    a sleep determiner configured to be capable of outputting a suspension control signal based on the feedback voltage or based on a voltage of a signal generated based on the feedback voltage; and
    an overvoltage detector configured to check whether or not the output voltage is in an overvoltage condition based at least on the feedback voltage and to output an overvoltage detection signal when the output voltage is in the overvoltage condition,
    wherein the controller is configured to suspend the switching operation in response to the suspension control signal and to restart the switching operation in response to the overvoltage detection signal while the switching operation is suspended.

2. The switching power supply device according to claim 1, wherein
    a coil is provided between the switching output stage and a terminal to which the output voltage is applied, and
    the controller is configured to, in response to the overvoltage detection signal while the switching operation is suspended, restart the switching operation in a manner that allows a reverse current to flow from the coil to the switching output stage.

3. The switching power supply device according to claim 2, wherein
    the switching output stage includes an output transistor and a synchronous rectification transistor that are connected in series with each other and that are turned on and off alternately through the switching operation based on the feedback voltage, and the controller includes:
    an error amplifier configured to output to an error signal line an error signal commensurate with a difference between the feedback voltage and a predetermined reference voltage; and
    a coil current detector configured to sense a current through the coil, which is connected in series between a connection node between the output transistor and the synchronous rectification transistor and the terminal to which the output voltage is applied, to output a current sense signal commensurate with the sensed current, and
    the controller is configured to achieve the switching operation by generating a drive signal for the switching output stage based on a signal on the error signal line and the current sense signal.

4. The switching power supply device according to claim 3,
    the sleep determiner outputs the suspension control signal based on a result of comparison of a signal voltage on the error signal line with a predetermined sleep determination voltage.

5. The switching power supply device according to claim 1, the sleep determiner is configured to output the suspension control signal based on a result of comparison of the feedback voltage with a predetermined sleep determination voltage.

6. A semiconductor device comprising the switching power supply device according to claim 1,
    wherein the semiconductor device is implemented as an integrated circuit.

7. A switching power supply device comprising:
    a switching output stage configured to generate an output voltage from an input voltage by switching operation;
    a controller configured to control the switching output stage based on a feedback voltage commensurate with the output voltage;
    a sleep determiner configured to be capable of outputting a suspension control signal based on the feedback voltage or based on a voltage of a signal generated based on the feedback voltage; and an overvoltage detector configured to check whether or not the output voltage is in an overvoltage condition based at least on the feedback voltage and to output an overvoltage detection signal when the output voltage is in the overvoltage condition, wherein the controller is configured to be capable of performing switching suspension control in which the controller suspends the switching operation on receiving the suspension control signal and to restart the switching operation on receiving the overvoltage detection signal while performing the switching suspension control, and wherein a coil is provided between the switching output stage and a terminal to which the output voltage is applied, and the controller is configured to, on receiving the overvoltage detection signal while performing the switching suspension control, restart the switching operation in a manner that allows a reverse current to flow from the coil to the switching output stage, and wherein the switching output stage includes an output transistor and a synchronous rectification transistor that are connected in series with each other and that are turned on and off alternately through the switching operation based on the feedback voltage, and the controller includes:

an error amplifier configured to output to an error signal line an error signal commensurate with a difference between the feedback voltage and a predetermined reference voltage; and a coil current detector configured to sense a current through the coil, which is connected in series between a connection node between the output transistor and the synchronous rectification transistor and the terminal to which the output voltage is applied, to output a current sense signal commensurate with the sensed current; and the controller is configured to achieve the switching operation by generating a drive signal for the switching output stage based on a signal on the error signal line and the current sense signal, and wherein the switching power supply device further comprises a clamp circuit configured to limit a variable range of the signal on the error signal line thereby to limit a variable range of the current through the coil during the switching operation, wherein a lower-limit value of the variable range of the current through the coil is set at one of a first lower-limit value and a second lower-limit value, when a current value in the coil is equal to or larger than the first lower-limit value, a current flows from the connection node toward the coil while, when a current value in the coil equals the second lower-limit value, the reverse current flows from the coil toward the connection node, and the controller is configured to control the clamp circuit such that, before receiving the overvoltage detection signal, the lower-limit value equals the first lower-limit value and that, on and after receiving the overvoltage detection signal, the lower-limit value equals the second lower-limit value.

8. The switching power supply device according to claim 7, further comprising a forcing circuit configured to forcibly set a signal voltage on the error signal line at a voltage corresponding to the second lower-limit value irrespective of an output of the error amplifier when the overvoltage detection signal is being output.

9. The switching power supply device according to claim 7, the controller is configured to, after restarting the switching operation in response to receipt of the overvoltage detection signal during the switching suspension control, on detecting elimination of the overvoltage condition, perform the switching operation continuously for a predetermined time irrespective of an output of the sleep determiner; and after a lapse of the predetermined time; to control the clamp circuit such that the lower-limit value returns from the second lower-limit value to the first lower-limit value.

10. A switching power supply device comprising:

a switching output stage configured to generate an output voltage from an input voltage by switching operation;

a controller configured to control the switching output stage based on a feedback voltage commensurate with the output voltage;

a sleep determiner configured to be capable of outputting a suspension control signal based on the feedback voltage or based on a voltage of a signal generated based on the feedback voltage; and an overvoltage detector configured to check whether or not the output voltage is in an overvoltage condition based at least on the feedback voltage and to output an overvoltage detection signal when the output voltage is in the overvoltage condition, wherein the controller is configured to be capable of performing switching suspension control in which the controller suspends the switching operation on receiving the suspension control signal and to restart the switching operation on receiving the overvoltage detection signal while performing the switching suspension control, and wherein a coil is provided between the switching output stage and a terminal to which the output voltage is applied, and the controller is configured to, on receiving the overvoltage detection signal while performing the switching suspension control, restart the switching operation in a manner that allows a reverse current to flow from the coil to the switching output stage, and wherein the switching output stage includes an output transistor and a synchronous rectification transistor that are connected in series with each other and that are turned on and off alternately through the switching operation based on the feedback voltage, and the controller includes:

an error amplifier configured to output to an error signal line an error signal commensurate with a difference between the feedback voltage and a predetermined reference voltage; and a coil current detector configured to sense a current through the coil, which is connected in series between a connection node between the output transistor and the synchronous rectification transistor and the terminal to which the output voltage is applied, to output a current sense signal commensurate with the sensed current, and the controller is configured to achieve the switching operation by generating a drive signal for the switching output stage based on a signal on the error signal line and the current sense signal, and wherein the switching power supply device further comprises a forcing circuit configured to forcibly set a signal voltage on the error signal line at a predetermined voltage irrespective of an output of the error amplifier when the overvoltage detection signal is being output, wherein the predetermined voltage is determined such that, during the switching operation with the signal voltage on the error signal line at the predetermined voltage, the reverse current flows from the coil toward the connection node.

11. A switching power supply device comprising:

a switching output stage configured to generate an output voltage from an input voltage by switching operation;

a first input terminal at which to receive a feedback voltage resulting from voltage division of the output voltage;

a second input terminal at which to receive the output voltage;

a controller configured to control the switching output stage based on a voltage at the first input terminal; and an overvoltage detector configured to check whether or not the output voltage is in an overvoltage condition based at least on the voltage at the second input terminal and to output an overvoltage detection signal when the output voltage is in the overvoltage condition, wherein a coil is provided between the switching output stage and a terminal to which the output voltage is applied, and the controller is configured to perform the switching operation in a manner that restricts a reverse current flowing from the coil to the switching output stage before receiving the overvoltage detection signal and to perform the switching operation in a manner that generates the reverse current in response to the overvoltage detection signal.

12. The switching power supply device according to claim 11, the switching output stage includes an output transistor and a synchronous rectification transistor that are connected in series with each other and that are turned on and off alternately through the switching operation based on the voltage at the first input terminal, and the controller includes:

an error amplifier configured to output to an error signal line an error signal commensurate with a difference between the voltage at the first input terminal and a predetermined reference voltage; and a coil current detector configured to sense a current through the coil, which is connected in series between a connection node between the output transistor and the synchronous rectification transistor and the terminal to which the output voltage is applied, to output a current sense signal commensurate with the sensed current, and the controller is configured to achieve the switching operation by generating a drive signal for the switching output stage based on a signal on the error signal line and the current sense signal.

13. A semiconductor device comprising the switching power supply device according to claim 11, wherein the semiconductor device is implemented as an integrated circuit.

14. A switching power supply device comprising a switching output stage configured to generate an output voltage from an input voltage by switching operation;

a first input terminal at which to receive a feedback voltage resulting from voltage division of the output voltage;

a second input terminal at which to receive the output voltage;

a controller configured to control the switching output stage based on a voltage at the first input terminal; and an overvoltage detector configured to check whether or not the output voltage is in an overvoltage condition based at least on the voltage at the second input terminal and to output an overvoltage detection signal when the output voltage is in the overvoltage condition, wherein a coil is provided between the switching output stage and a terminal to which the output voltage is applied, and the controller is configured to perform the switching operation in a manner that restricts a reverse current flowing from the coil to the switching output stage before receiving the overvoltage detection signal and to perform the switching operation in a manner that generates the reverse current on and after receiving the overvoltage detection signal, and the switching output stage includes an output transistor and a synchronous rectification transistor that are connected in series with each other and that are turned on and off alternately through the switching operation based on the voltage at the first input terminal, and the controller includes:

an error amplifier configured to output to an error signal line an error signal commensurate with a difference between the voltage at the first input terminal and a predetermined reference voltage; and a coil current detector configured to sense a current through the coil, which is connected in series between a connection node between the output transistor and the synchronous rectification transistor and the terminal to which the output voltage is applied, to output a current sense signal commensurate with the sensed current, and the controller is configured to achieve the switching operation by generating a drive signal for the switching output stage based on a signal on the error signal line and the current sense signal, and wherein the switching power supply device further comprises a clamp circuit configured to limit a variable range of the signal on the error signal line thereby to limit a variable range of the current through the coil during the switching operation, wherein a lower-limit value of the variable range of the current through the coil is set at one of a first lower-limit value and a second lower-limit value, when a current value in the coil is equal to or larger than the first lower-limit value, a current flows from the connection node toward the coil while, when a current value in the coil equals the second lower-limit value, the reverse current flows from the coil toward the connection node, and the switching power supply device further comprises a forcing circuit configured to forcibly set a signal voltage on the error signal line at a voltage corresponding to the second lower-limit value irrespective of an output of the error amplifier when the overvoltage detection signal is being output.

15. The switching power supply device according to claim 14, wherein the controller is configured to control the clamp circuit such that, before receiving the overvoltage detection signal, the lower-limit value equals the first lower-limit value and that, on and after receiving the overvoltage detection signal, the lower-limit value equals the second lower-limit value.

16. A switching power supply device comprising
a switching output stage configured to generate an output voltage from an input voltage by switching operation;
a first input terminal at which to receive a feedback voltage resulting from voltage division of the output voltage;
a second input terminal at which to receive the output voltage;
a controller configured to control the switching output stage based on a voltage at the first input terminal; and
an overvoltage detector configured to check whether or not the output voltage is in an overvoltage condition based at least on the voltage at the second input terminal and to output an overvoltage detection signal when the output voltage is in the overvoltage condition,
wherein a coil is provided between the switching output stage and a terminal to which the output voltage is applied, and the controller is configured to perform the switching operation in a manner that restricts a reverse current flowing from the coil to the switching output stage before receiving the overvoltage detection signal and to perform the switching operation in a manner that generates the reverse current on and after receiving the overvoltage detection signal, and
the switching output stage includes an output transistor and a synchronous rectification transistor that are connected in series with each other and that are turned on and off alternately through the switching operation based on the voltage at the first input terminal, and
the controller includes:
an error amplifier configured to output to an error signal line an error signal commensurate with a difference between the voltage at the first input terminal and a predetermined reference voltage; and
a coil current detector configured to sense a current through the coil, which is connected in series between a connection node between the output transistor and the synchronous rectification transistor and the terminal to which the output voltage is applied, to output a current sense signal commensurate with the sensed current, and the controller is configured to achieve the switching operation by generating a drive signal for the switching output stage based on a signal on the error signal line and the current sense signal, and
wherein the switching power supply device further comprises a forcing circuit configured to forcibly set a signal voltage on the error signal line at a predetermined voltage irrespective of an output of the error amplifier when the overvoltage detection signal is being output,
wherein the predetermined voltage is determined such that, during the switching operation with the signal voltage on the error signal line at the predetermined voltage, the reverse current flows from the coil toward the connection node.

* * * * *